United States Patent
Schoeny et al.

(10) Patent No.: US 10,638,655 B2
(45) Date of Patent: May 5, 2020

(54) SEED METER WITH MULTIPLE SENSORS FOR SEED CELL STATUS MONITORING

(71) Applicant: CNH Industrial America, LLC, New Holland, PA (US)

(72) Inventors: Christopher Schoeny, Yorkville, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 126 days.

(21) Appl. No.: 15/910,183

(22) Filed: Mar. 2, 2018

(65) Prior Publication Data

US 2019/0090415 A1 Mar. 28, 2019

Related U.S. Application Data

(63) Continuation of application No. 15/712,375, filed on Sep. 22, 2017, now Pat. No. 10,257,974.

(51) Int. Cl.
| | |
|---|---|
| *A01C 7/10* | (2006.01) |
| *A01B 79/00* | (2006.01) |
| *A01C 7/04* | (2006.01) |
| *A01C 7/20* | (2006.01) |
| *B60Q 1/26* | (2006.01) |

(52) U.S. Cl.
CPC ............ *A01C 7/105* (2013.01); *A01B 79/005* (2013.01); *A01C 7/046* (2013.01); *A01C 7/205* (2013.01); *A01C 7/107* (2013.01); *B60Q 1/26* (2013.01)

(58) Field of Classification Search
CPC ........... A01C 7/105; A01C 7/102; A01C 7/10; A01C 7/08; A01C 7/00; A01C 79/005; A01C 79/00; A01C 7/046; A01C 7/044; A01C 7/042; A01C 7/04; A01C 7/205;
(Continued)

(56) References Cited

U.S. PATENT DOCUMENTS

| | | |
|---|---|---|
| 5,956,255 A | 9/1999 | Flamme |
| 7,086,269 B2 | 8/2006 | Sauder et al. |

(Continued)

FOREIGN PATENT DOCUMENTS

| | | |
|---|---|---|
| DE | 102011010100 | 8/2012 |

OTHER PUBLICATIONS

Elsevier S. Kamgar, F. Noei-Khodabadi and S.M. Shafaei. "Design, Development and Field Assessment of a Controlled Seed Metering Unit to be Used in Grain Drills for Direct Seeding of Wheat" Information Processing in Agriculture 2 (2015) 169-176 Available at www.sciencedirect.com Journal Homepage: www.elsevier.com/locate/inpa (14 pages).

(Continued)

*Primary Examiner* — Christopher J. Novosad
(74) *Attorney, Agent, or Firm* — Rebecca L. Henkel; Rickard K. DeMille

(57) ABSTRACT

A vacuum seed meter includes a vacuum channel and a seed transport member having seed cells defined as openings through a perimeter region of the seed transport member, which rotates through the vacuum channel. The seed meter includes a plurality of sensors, each of the plurality of sensors targeting a different location within the seed meter. Each of the plurality of sensors connected to send signals to a controller that evaluates whether each seed cell passing through these locations is filled or empty.

20 Claims, 12 Drawing Sheets

(58) Field of Classification Search
CPC ........... A01C 7/201; A01C 7/20; A01C 7/107; A01B 79/005; A01B 79/00
See application file for complete search history.

(56) References Cited

U.S. PATENT DOCUMENTS

| | | |
|---|---|---|
| 7,478,603 B2 | 1/2009 | Riewerts et al. |
| 8,365,679 B2 | 2/2013 | Landphair et al. |
| 8,942,896 B2 | 1/2015 | Mayerle |
| 9,345,189 B2 | 5/2016 | Harmelink et al. |
| 9,426,940 B2 | 8/2016 | Connors et al. |
| 9,474,201 B2 | 10/2016 | Wilhelmi et al. |
| 2003/0024155 A1* | 2/2003 | Kuroda ................. A01G 25/167 47/1.01 R |
| 2014/0121910 A1 | 5/2014 | Carr et al. |
| 2015/0223390 A1 | 8/2015 | Wendte et al. |
| 2016/0255766 A1 | 9/2016 | Assy et al. |
| 2016/0302353 A1 | 10/2016 | Wendte et al. |
| 2016/0366814 A1 | 12/2016 | Roszman |
| 2017/0086351 A1 | 3/2017 | Garner et al. |

OTHER PUBLICATIONS

Precision Planting LLC 20/20 SeedSense www.precisionplanting.com Dated: 2017 (6 pages).

\* cited by examiner

SEED METER WITH MULTIPLE SENSORS FOR SEED CELL STATUS MONITORING

CROSS-REFERENCE TO RELATED APPLICATIONS

This application is a continuation of and claims the right of priority to U.S. patent application Ser. No. 15/712,375, filed Sep. 22, 2017, the disclosure of which is hereby incorporated by reference herein in its entirety for all purposes.

FIELD OF THE INVENTION

The present subject matter relates generally to seed meters and more particularly to seed meters that are monitored by at least one sensor.

BACKGROUND OF THE INVENTION

A seed meter carried on a row unit of a planting implement dispenses seed and includes a seed transport member in which a plurality of seed cells is defined around the outer perimeter region thereof. As the seed transport member rotates within the housing of the seed meter, each individual seed cell completes repeated rotations around the housing of the seed meter. During each rotation, each particular seed cell will pass through different regions of the seed meter. When passing through the seed pool region of the seed meter, each seed cell typically acquires at least one seed during normal operation of the seed meter.

It is known to draw inferences about the operational status of the seed meter by a sensor that detects when seed is dropping through the seed tube. However, seed tube sensors are exposed to the dust buildup from the seeds, the field and from seed lubricant, and thus the information obtained can prove unreliable. It also is known to provide a sensor within the seed pool region of the seed meter in order to monitor whether there are sufficient seeds in the seed pool to enable each seed cell to acquire seed so that the seed meter can operate in a normal fashion. However, because the information provided by such sensors can result from any of a number of different operating conditions within the seed meter, such sensors only provide indirect evidence of the operational status of the seed meter in real time. Thus, it is difficult to use this information as the basis for diagnosing operational malfunctions of the seed meter and accordingly prescribing corrective actions to overcome or ameliorate such malfunctioning of the seed meter.

BRIEF DESCRIPTION OF THE INVENTION

Aspects and advantages of the invention will be set forth in part in the following description, or may be obvious from the description, or may be learned through practice of the invention.

Seed meters configured in accordance with the present invention include a plurality of sensors that are mounted to the seed meter. Moreover, each one of the plurality of the sensors has its sensing end disposed so as to target its detection zone within the housing of the seed meter, some within the vacuum chamber of the seed meter and at least one outside of the vacuum chamber of the seed meter. Each sensor is oriented to detect the presence or absence of seed within a seed cell of the seed transport member when that seed cell passes through the detection zone of the sensor. The detection zone of each sensor desirably is targeted at a different region within the seed meter, though more than one sensor can be targeting a different location within the same region of the seed meter. In lieu of a plurality of sensors, the seed meter can include a single sensor having its sensing end disposed so that its detection zone falls within the housing and aimed at the region of the seed meter immediately before the seed cells encounter the singulator during each complete rotation of the seed transport member within the housing of the seed meter.

A controller is provided to receive and evaluate the voltage signals emitted by each of the plurality of sensors. Each sensor emits voltage signals with peaks and valleys of sufficient resolution to enable the controller to differentiate that signal to determine whether a seed cell is presented within the detection zone of the sensor, as opposed to an interstitial portion of the seed transport member being presented within the detection zone of the sensor, and whether the seed cell is filled or empty. The location where the detection zone of each sensor is targeted is chosen so that the controller will be provided with information about seed cell status (filled or empty) at different locations within the seed meter at a given moment (or series of closely spaced moments). The controller is preprogrammed to use this information according to various protocols. Each protocol is tailored to enable the controller to make judgments about the operating status of the seed meter and to take one or more actions based on such judgments. Such actions can include adjusting various operating parameters of the seed meter or adjusting various operating parameters of the planting implement. Examples of such operating parameters of the seed meter include adjusting the vacuum level within the seed meter, adjustments to the seed singulator, adjustments to any seed baffle, adjustments to seed agitation, adjustments to any seed gates whether opening or closing, and adjustments to any fluted rollers provided for seed supply whether engaging or disengaging. An example of such operating parameters of the planting implement would be adjustments to the planting speed.

Seed meters configured in accordance with the present invention provide more accurate monitoring of the presence or absence of seed within individual seed cells of the seed transport member at more than one desired location through which these seed cells will be rotating during operation of the seed meter and thus afford greater control over operation of each individual seed meter. More specifically, in some embodiments, a plurality of sensors are arrayed to target different locations within the seed meter to detect when the seeds are either filling particular seed cells or absent from particular seed cells when passing predetermined locations within the seed meter. One of those particular locations is where the seed cell is outside of the influence of the vacuum channel and expected to be empty of any seed. A second one of those particular locations is where the seed cell would likely not acquire a seed when the seed chamber is almost depleted of seed. In embodiments in which the seed meter includes a seed singulator, two additional locations for a sensor directed at the passage of seed cells in the seed transport member are immediately before the seed cells encounter the seed singulator and immediately after the seed cells leave the seed singulator.

According to one embodiment of a seed cell detection system, the controller is preprogrammed to evaluate the signals emitted by each of the plurality of sensors. The controller is preprogrammed to determine whether the respective seed cells are passing through the respective detection zone of each sensor and whether the respective seed cell is filled or empty based on the patterns of voltages being emitted to the controller by one or more of the sensors. This system has the advantage of being capable of implementation without requiring any fixed clocking or timing relationship between the locations of the seed cells relative to the detection zones of the sensors. Accordingly, this method can be employed with many different seed transport members, which have a different number of seed cells around the periphery of the seed transport member. However, in order to implement this embodiment of the seed meter, the controller must be capable of a somewhat complex analysis of the signals from the sensors targeting the difference regions within the seed meter.

According to one embodiment of a seed meter with a cell detection system in accordance with the present invention, one of the sensors functions as a timing sensor, which desirably is disposed to monitor seed cells that pass outside of the vacuum region of the seed meter. Desirably, the sensor that issues the timing signal has its detection zone disposed to target seed cells that are passing through the seed meter's post-delivery region, in which the seed cells are outside the influence of the vacuum chamber of the seed meter. The controller is preprogrammed to evaluate the signals emitted by the timing sensor to determine the moment when the seed cell is passing through the detection zone of the timing sensor and whether the seed cell is filled or empty based on the patterns of voltages being emitted to the controller by the timing sensor. In these embodiments, the timing sensor can be used by the controller as a timing mechanism that determines the frequency with which the seed cells will pass in front of the detection zones of the other sensors that are targeting seed cells that are within the influence of the vacuum chamber so that the signals received from these other sensors can be evaluated by the controller in a coordinated fashion and thereby enable the controller to focus its evaluations on only the moment or those intervals during which a seed cell is presented to these other sensors.

According to this embodiment, when the timing sensor sends to the controller a signal indicative of the open cell, the controller is configured so that upon receiving from the timing sensor this signal indicative of the open cell, the controller evaluates at this first moment the signals received from the other sensors that have their respective detection zones disposed to target other regions of the seed meter. The geometry of the locations of the seed cells relative to the detection zones of the timing sensor and the other sensors is fixed, and thus a seed cell coincident with the detection zone of the timing sensor ensures that a respective other seed cell will likewise be coincident with the respective detection zone of each of the other sensors. This embodiment has the advantage of being capable of implementation without requiring of the controller any complex analysis of the signals received from the sensors targeting seed cells passing through the vacuum region in order to detect open seed cells in different regions of the seed meter.

According to a related embodiment, the controller is preprogrammed to evaluate signals received from each of the plurality of sensors over a predetermined duration of time (or a predetermined rotational increment of the seed transport member) from the first moment when the timing sensor reports to the controller a signal indicating an open cell passing through the detection zone of the timing sensor. The controller is configured so that upon receiving from the timing sensor this signal indicative of the open cell, the controller begins at this first moment a discrete number of samplings of the signals received from the other sensors, which have their respective detection zones disposed to target seeds within seed cells that are passing through other regions of the seed meter, and evaluates these signals to determine whether an open cell was encountered. In order to implement this embodiment, the controller must be capable of a more complex analysis of the signals from the sensors targeting regions within the vacuum region of the seed meter than was the case with the previous embodiment.

In other exemplary embodiments of the present invention, a rotary encoder signal can be provided to enable the controller to determine when a cell of the seed transport member will present itself proximate the detection zone of the sensors other than the timing sensor. The controller will be able to count the pulses received from the rotary encoder in relation to when one of the sensors generates a signal indicating an open seed cell in the detection zone of that one sensor.

According to an additional embodiment, the timing sensor detects an open cell passing through its detection zone aimed at the seed transport member at a first moment. The timing sensor sends to the controller a signal indicative of the open cell. The controller is preprogrammed for monitoring the pulses from the rotary encoder and is preprogrammed with the number of such pulses that must ensue from this first moment until each respective one of the other sensors will have its detection zone aligned coincidentally with a passing seed cell on the seed transport member. The controller is preprogrammed to use this relationship in order to evaluate at the appropriate number of ensuing pulses from the rotary encoder the respective signal received from the respective other sensor that has its respective detection zone disposed to target seeds within seed cells that are passing through the respective other region of the seed meter. This embodiment has the advantage of being capable of implementation without requiring any fixed geometrical relationship between the locations of the seed cells relative to the detection zones of the timing sensor and the other sensors. Accordingly, this method can be employed with many different seed transport members, which have a different number of seed cells around the periphery of the seed transport member. This method has the further advantage of being capable of implementation without requiring of the controller any complex analysis of the signals received from the sensors targeting seed cells passing through the vacuum chamber in order to detect open seed cells in different regions of the seed meter.

In still another embodiment, in place of the seed cell of the seed transport member, a discernible feature on the seed transport member other than a seed cell, for example a highly reflective surface, a gap, a hole, a boss, a protrusion, a metallic feature, or a magnet, can be detected by the timing sensor as a timing feature (a.k.a. index feature) to establish the timing of when a seed cell of the seed transport member will present itself within the detection zone of a sensor.

Due to the constant high velocity air passing through the vacuum channel, any accumulation or build-up of dust or other contaminants on a sensor disposed in the vacuum channel is prevented to a significant degree. Examples of sensors that can be placed inside the vacuum channel of a vacuum seed meter can include an optical sensor or a capacitive proximity sensor. Each of these types of sensors can be aimed at or adjacent a path taken by the seed cells (or an alternative feature) on the rotating seed transport member. The sensor can be aimed to emit and receive energy along a direction that is perpendicular to the plane of the seed transport member to allow seed cells to pass directly into the detection zone of the sensors. Alternatively, the sensor can be aimed to emit and receive energy along a direction that is parallel to the plane of the seed transport member to allow the sensors to detect the seed without the seed cells passing directly into the detection zone of the sensors. The signal generated by the sensor in response to the energy received by the sensor can be provided to a controller to indicate when the seed cells of the seed meter are either filled or vacant of seed.

If the optical sensor is a reflectance style sensor, the entire sensor would be located within the vacuum channel. Light reflecting off the seed transport member and the seed in the seed cells as the seed cells pass by the sensor would be received by the sensor assembly. If the optical sensor is a break beam style sensor, either the emitter or the receiver would be fitted in the vacuum channel while the other element would be located behind the seed pool in the seed meter. Though one of these elements would be susceptible to dust buildup, the other element would remain in a relatively clean environment that would remain relatively unaffected by any buildup of dust or other contaminants.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
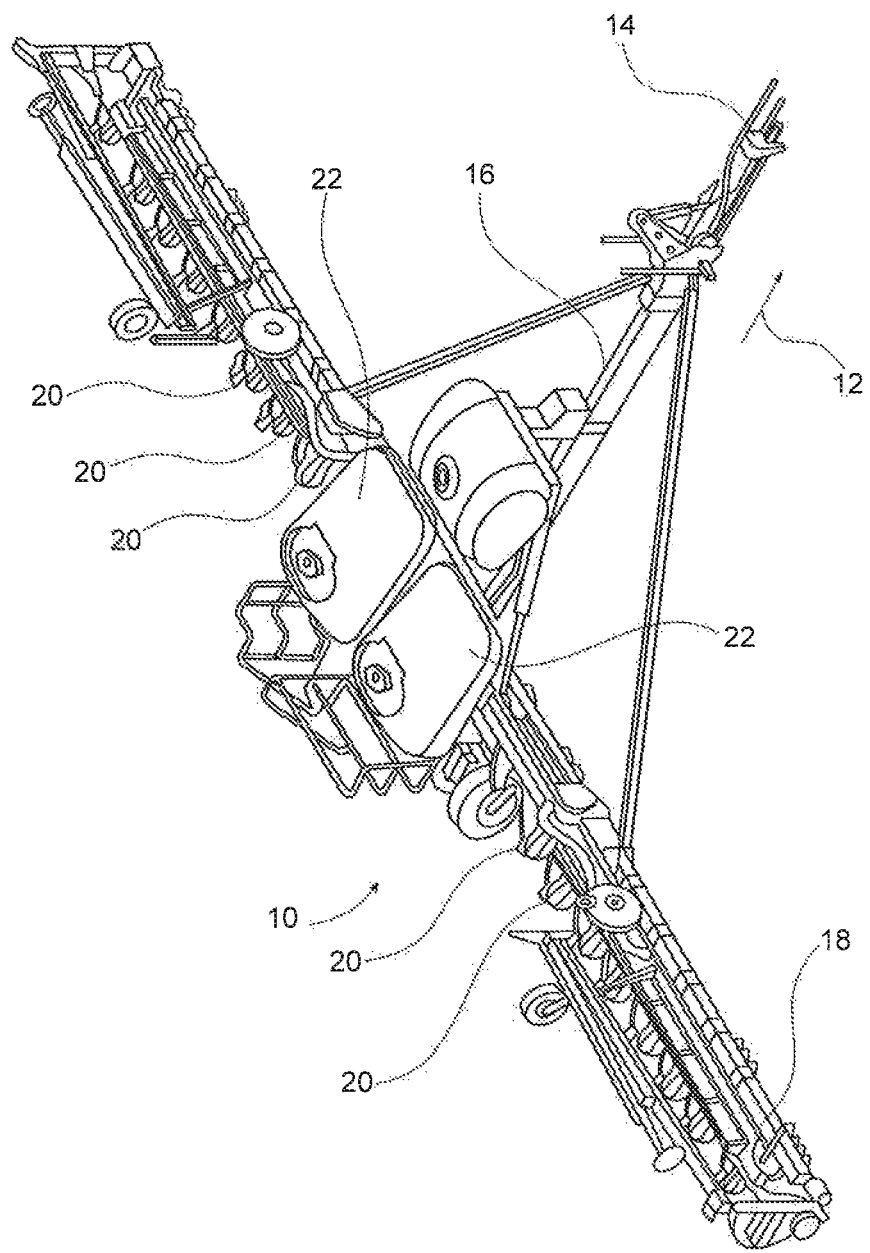
FIG. 1 provides a perspective view of a planting implement configured to deposit seeds into a soil surface, in accordance with an embodiment.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Generally, a vacuum seed meter is one that employs vacuum pressure to attach seeds to a rotating seed transport member, which controls the rate at which seeds are output by the seed meter. As used herein, "vacuum pressure" is intended to describe a pressure that is lower than ambient atmospheric pressure and not necessarily a true vacuum.

As shown in FIG. 1, a planting implement 10 that may be used to deposit seeds into a soil surface desirably includes a hitch assembly 14, a main frame assembly 16 and a tool bar 18. As depicted in FIG. 1, the hitch assembly 14 is coupled to the main frame assembly 16, and the main frame assembly 16 is coupled to the tool bar 18. When a work vehicle such as a tractor or other prime mover is coupled to the implement 10 by the hitch assembly 14, the implement 10 may be towed along a direction of travel 12 by the work vehicle.

As additionally depicted in FIG. 1, the tool bar 18 is coupled to multiple row units 20 so that several rows of seeds can be planted simultaneously into the ground. Thus, as the work vehicle tows the implement 10, each of the row units 20 may deposit seeds at a desired depth beneath the soil surface, thereby establishing the same number of rows of planted seeds. In addition, the spacing between row units may be particularly pre-selected based on the type of seed being planted. For example, the row units may be spaced 30 inches from one another for planting corn, and 15 inches from one another for planting soybeans. Moreover, since each of the multiple row units 20 is spaced apart from even its closest row unit 20, the operating conditions experienced by each row unit 20 may vary. Though the illustrated implement 10 includes 24 row units 20, alternative implements may include more or fewer row units 20. For example, certain implements 10 may include 6, 8, 12, 16, 24, 32, or 36 row units, or more.

Figure 2:
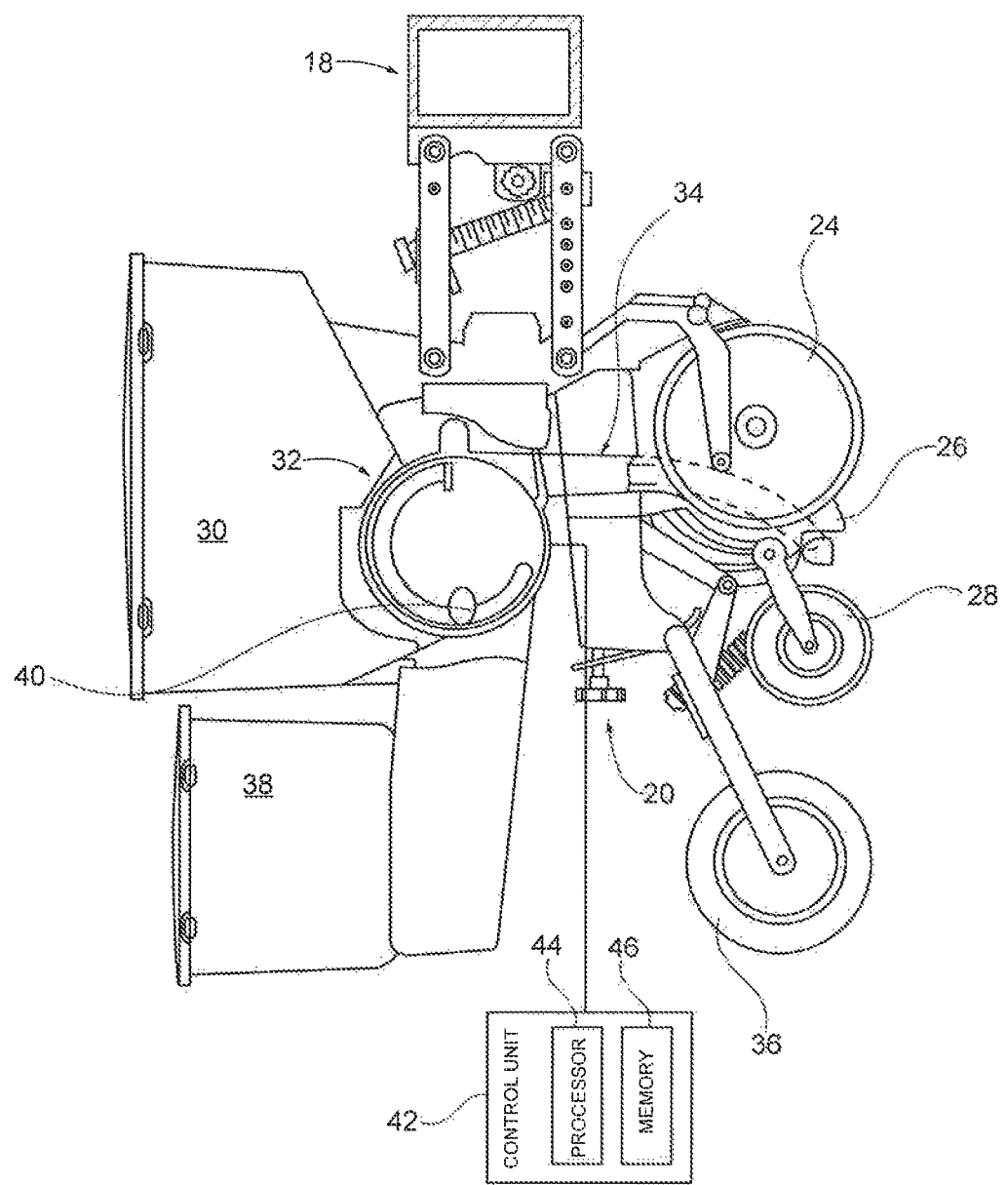
FIG. 2 provides a side view of a row unit on the planting implement of FIG. 1, in accordance with an embodiment.

As shown in FIG. 1 for example, in some embodiments, the bulk of the seeds to be planted may be stored in seed tanks 22 that are carried by the tool bar 18. Each of the seed tanks 22 can be filled with a different variety of seed. FIG. 2 depicts a row unit 20 that may be used to deposit seeds. As depicted in FIG. 2, to facilitate depositing seeds, each row unit 20 includes a furrow opener disc 24, an opener shoe 26, a closing disc 28, a seed hopper 30, a seed meter 32, a seed tube 34, a press wheel 36, and a granular chemical product hopper 38. As the row unit 20 travels along a field, the furrow opener disc 24 and the opener shoe 26 engage the soil and cooperate to form a trench for seeds to be deposited.

Figure 4:
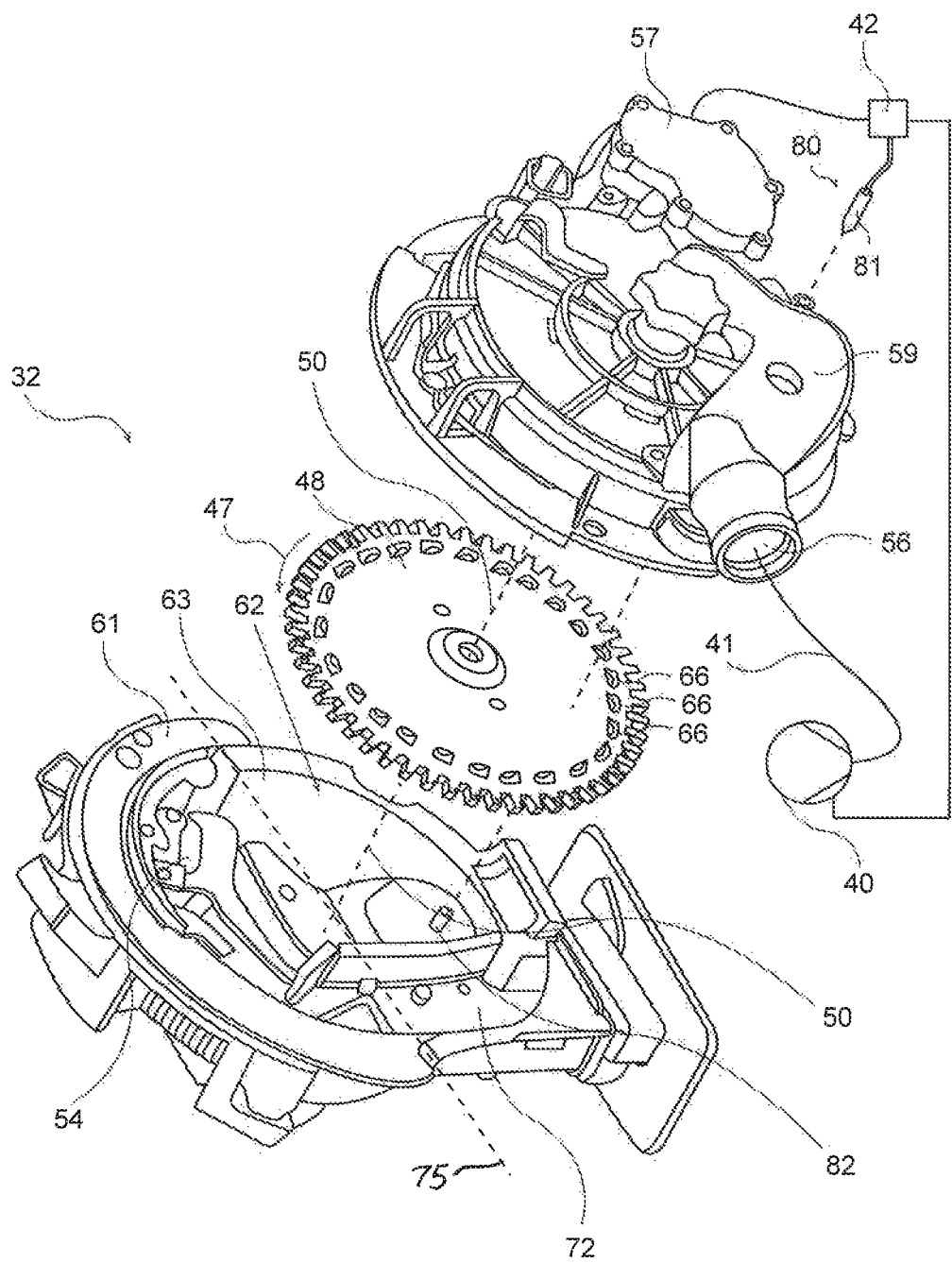
FIG. 4 provides a perspective view from the opposite end of the view shown in FIG. 3 of the partially disassembled condition of an embodiment of a seed meter of a row unit on the planting implement of FIG. 1.

As schematically shown in FIGS. 2 and 4 for example, the operation of the seed meter 32 desirably is controlled by a control unit or controller 42, which desirably can include a processor 44 and a memory device 46. In some embodiments, the controller 42 can be provided as an integral component of the seed meter 32 and carried on the housing thereof. In other embodiments, the controller 42 can be carried elsewhere on the planting implement 10 and connected, either directly by physical electrical wiring connections or wirelessly for example. In some embodiments of the controller 42, the processor 44 may include one or more general purpose processors, one or more application specific integrated circuits, one or more field programmable gate arrays, or the like. Additionally, the memory device 46 may include any tangible, non-transitory, computer readable medium that is capable of storing instructions executable by the processor 44 and/or data that may be processed by the processor 44. In other words, the memory 46 may include volatile memory, such as random access memory, or non-volatile memory, such as hard disc drives, read only memory, optical discs, flash memory, and the like.

Figure 6:
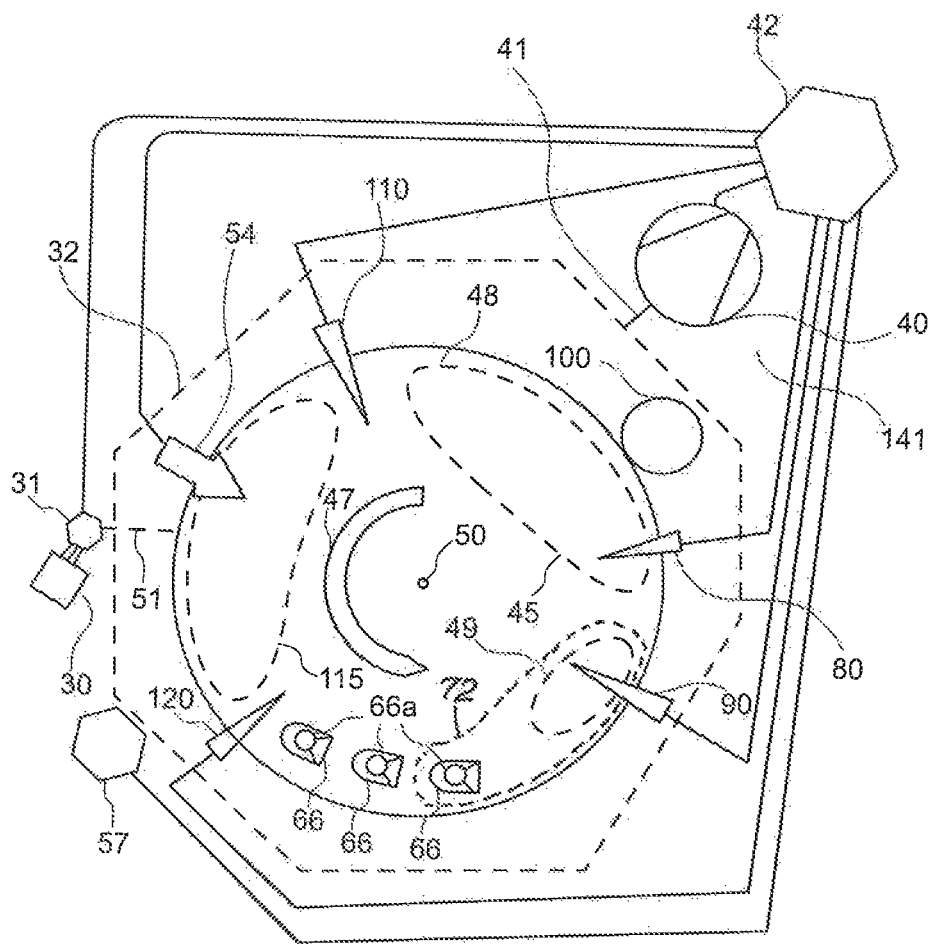
FIG. 6 provides a schematic representation of the spatial and communication relationships of the various sensors, the rotary encoder, the vacuum source, the controller and the seed cells of the seed transport member of the seed meter.

In the embodiment depicted in FIG. 2, the seeds received from the seed tanks 22 (FIG. 1) may be stored in the seed hopper 30 before they are deposited. From the seed hopper 30, the seeds are transferred into the entrance of the seed meter 32. As schematically shown in FIG. 6 for example, a switching mechanism 31 can be provided and connected to be operated by the controller 42 to control the selection of the flow of different varieties of seed into the entrance of the seed meter 32 from the seed hopper 30. The switching mechanism 31 can be interposed between the seed hopper 30 and the seed meter 32 as schematically shown in FIG. 6, or alternatively the switching mechanism 31 can be incorporated into the seed hopper 30, as the case may be. The seeds are discharged from the outlet of the seed meter 32 and into the inlet of the seed tube, which is indicated generally in FIG. 2 by the numeral 34, at the upper end thereof such that the seeds travel under the influence of gravity down through the seed tube 34 and exit from the bottom end of the seed tube 34 into the trench. Once the seeds are deposited into the trench, the closing disc 28 covers the deposited seeds, and the press wheel 36 packs the soil over the deposited seeds.

The manner in which the seeds are dispensed to the seed tube 34 from the output of the seed meter 32 determines the rate and/or spacing of the seeds into the trench. In other words, by controlling the output of seeds from the seed meter 32, for example, by reducing the possibility of multiple seeds being deposited in the same location (e.g., a multiple) or a seed not being planted in a desired location (e.g., a skip), operation of the seed meter 32 according to one suitable protocol enables the seeds to be planted at desired locations. Operation of the seed meter 32 according to another suitable protocol enables a multi-variety seed meter to switch seed varieties flowing through the same seed meter on the fly by shutting off the first variety of seed for a very minimal duration of time before switching to the successive seed variety to be planted in order to minimize mixing of seed varieties being dispensed. However, implementation of the protocol in each case demands a way of sensing in real time a reliable indication of the dispensing status of the seed meter 32. Accordingly, the present invention addresses such needs, among others.

Basic components and operation of a vacuum seed meter are described in some detail in U.S. Pat. No. 9,426,940, which is hereby incorporated herein by this reference for all purposes. However, only those components playing a role in the understanding of the present invention will be described herein in any detail.

Figure 3:
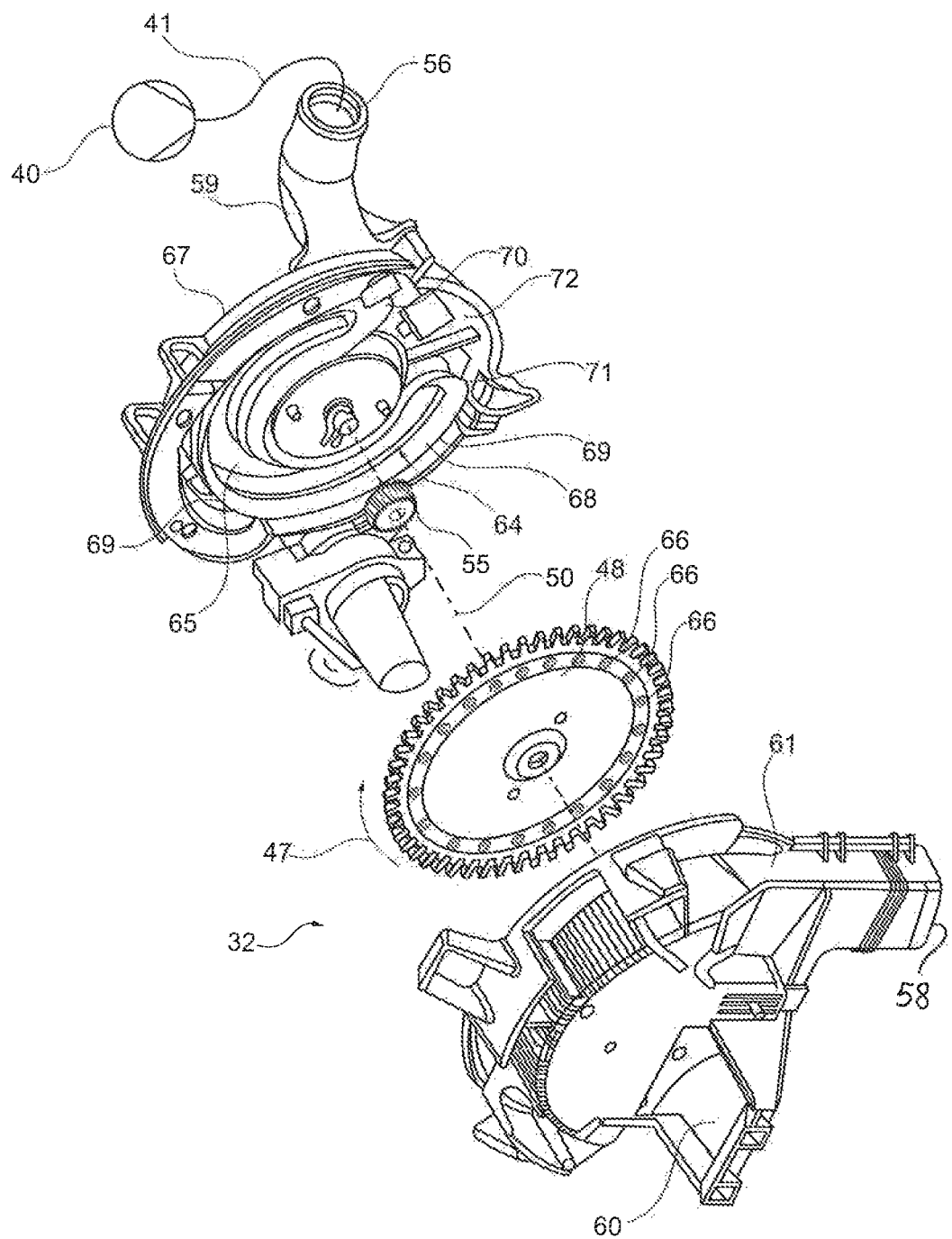
FIG. 3 provides a perspective view in a partially disassembled condition of an embodiment of a seed meter of a row unit on the planting implement of FIG. 1.

The seed meter 32 generally includes an exterior housing that in a disassembled state depicted in FIGS. 3 and 4 desirably includes a seed cover assembly 61 disposed in opposition to a mechanical housing assembly 67. As shown in FIG. 3 for example, the seed meter 32 also generally includes a seed transport member 48 that is disposed between the seed cover assembly 61 and the mechanical housing assembly 67. The seed transport member 48 is carried by the housing about a central axis of rotation schematically designated by the chain dashed line designated by the numeral 50 in FIG. 3. While the exemplary embodiment of the seed transport member 48 is formed by a rigid planer disc, the seed transport member 48 can take on other configurations such as for example the shape of a bowl, a bowler hat, a top hat, a conic, a drum, or any other shape that is symmetric about a central axis of rotation. As shown in FIG. 4 for example, this rotational axis 50 of the seed transport member 48 also runs through the horizontal center plane 75 of the seed chamber 62. As shown in FIG. 4 for example, the outer edge of the seed transport member 48 can be configured to engage and be driven by a drive sprocket 55 that is rotatably driven in turn by a motor 57 that can be operatively connected and controlled by the controller 42 to effect rotation of the seed transport member 48 within the housing about the central axis 50.

As shown in FIG. 4 for example, the seed cover assembly 61 includes a seed chamber wall 63, and a seed chamber 62 is at least partially defined by the seed chamber wall 63 and the seed transport member 48. As shown in FIG. 3 for example, the mechanical housing assembly 67 includes a vacuum channel wall 65, and a vacuum channel 64 is at least partially defined by the vacuum channel wall 65 and the seed transport member 48. The seed transport member 48 that is rotatably carried by the housing is disposed between the seed chamber wall 63 and the vacuum channel wall 65. The seed transport member 48 is spaced apart from the seed chamber wall 63 to define the seed chamber 62 between the seed transport member 48 and the seed chamber wall 63. Thus, as shown in FIG. 4 for example, one of the sides of the seed transport member 48 faces into the seed chamber 62, while as shown in FIG. 4 for example, the opposite side of the seed transport member 48 faces into the vacuum channel 64.

As schematically shown in FIGS. 2, 3 and 4 for example, an embodiment of the seed meter 32 may be connected to a vacuum source 40 via a vacuum conduit that is schematically designated by the numeral 41 in FIGS. 3, 4 and 6. As schematically shown in FIG. 3 for example, the vacuum conduit 41 leads from the vacuum source 40 to the vacuum port 56 of a vacuum manifold 59, through which a negative pressure from the vacuum source 40 is imposed within the vacuum channel 64 of the seed meter 32.

As shown in FIGS. 3, 4, 5, 6, 7 and 8 for example, multiple seed cells 66 are defined around a perimeter region of the seed transport member 48. The seed cells 66 are spaced uniformly apart from each other around the perimeter of the seed transport member 48 so that constant rotation of the seed transport member 48 results in a commensurately constant rate at which a seed cell 66 passes a given fixed point of the housing of the seed meter 32. As shown FIG. 9 and in the enlarged area in the insert for FIG. 5 for example, each seed cell 66 includes an opening 66a through the seed transport member 48. Moreover, in one side of the seed transport member 48, each opening 66a of each seed cell 66 desirably can be variously configured depending on the type of seed that the seed transport member 48 is intended to dispense. In most embodiments, each seed cell 66 is configured to carry a single seed of a particular type of seed 51 as schematically shown in FIG. 9. In multi-seed embodiments, each seed cell 66 is configured to carry more than a single seed of a particular type of seed or multiple varieties of seed.

The seed transport member 48 is spaced axially apart (in the direction along the central axis of rotation 50) from the vacuum channel wall 65. As shown in FIG. 3, a sealing gasket 68 desirably is disposed between the vacuum channel wall 65 and the seed transport member 48 and defines a sealing edge 69 that seals against the face of the seed transport member 48 disposed toward the vacuum channel wall 65 when the seed meter 32 is fully assembled. Thus, as shown in FIG. 3 for example, the seed transport member 48, the vacuum channel wall 65 and the sealing gasket 68 combine to define the vacuum channel 64 that extends continuously about three quarters of the way around the circumference of the seed transport member 48. Moreover, as shown in FIG. 3 for example, the vacuum channel 64 is configured and confined to be coincident with the perimeter portion of the seed transport member 48 in which the seed cells 66 are defined. Accordingly, at any given time when the vacuum source 40 is being operated to impose a negative pressure inside the vacuum channel 64, about one quarter of the seed transport member 48 is not subjected to the negative pressure established within the seed chamber 62 while the remaining three quarters of the seed transport member 48 is subjected to the vacuum force of the vacuum source 40. Thus, as schematically shown in FIGS. 3 and 5 for example, the one quarter of the seed transport member 48 that extends between the proximal end 71 and distal end 70 of the vacuum channel 64 and that is not subjected to the negative pressure established within the seed chamber 62, generally coincides with the seed meter's post-delivery region 72, which is the region between the point where the seed 51 is separated from the seed transport element 48 and the point where the seed cells 66 are reintroduced to the seed pool in the seed chamber 62 of the seed meter 32.

Figure 7:
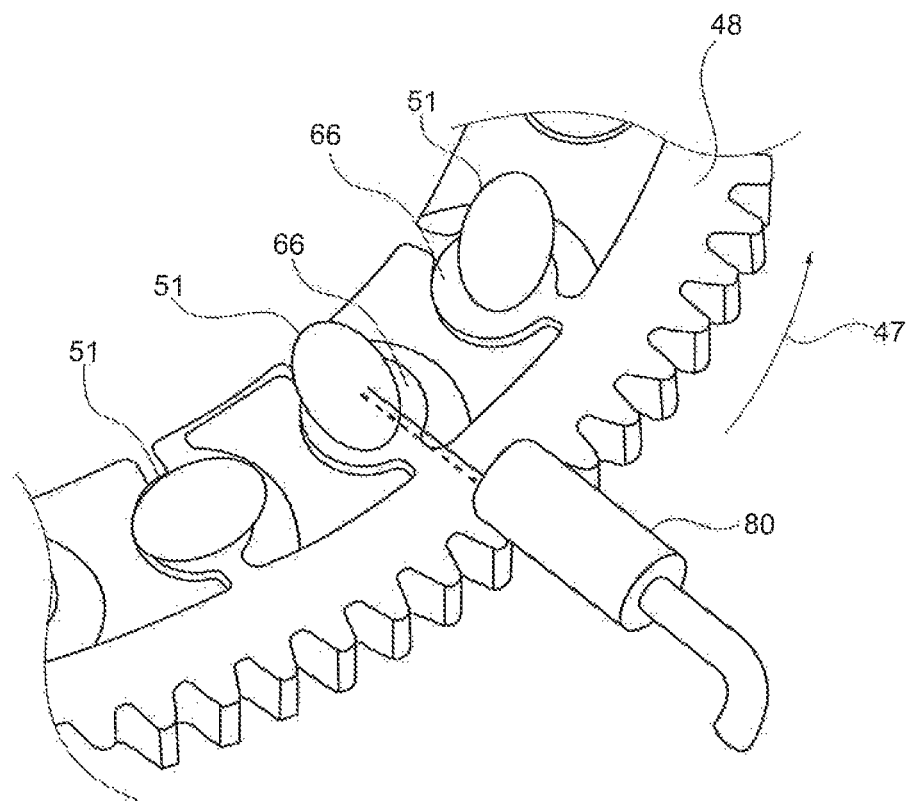
FIG. 7 provides a schematic representation of a section of the seed transport member passing through a region successively intermediate the seed acquisition region and the post-delivery region of the seed meter and a sensor having its sensing end disposed within the seed chamber of the housing and oriented to emit and receive in a direction that is relatively parallel to the plane of the surface of the seed transport member to detect when a seed passes through the detection zone of the sensor.

In operation, the seed meter 32 receives seeds from the seed hopper 30 (FIG. 2). The seeds are provided via the seed input port 60 shown in FIG. 3 for example and become stored in the seed chamber 62 of the seed meter 32. As schematically shown in FIGS. 3 and 4 for example, the vacuum source 40, which is coupled to a vacuum port 56 formed at one end of a vacuum manifold 59 that is connected to the mechanical housing assembly 67, desirably is used to output seeds from the seed meter 32. As schematically shown in FIGS. 3, 7 and 9 for example, the seed cells 66 passing over the vacuum channel 64 are subjected to this same negative pressure (e.g., a pressure lower than atmospheric pressure). As schematically shown in FIGS. 5, 7 and 9 for example, the negative pressure sucks the seeds 51 (FIG. 9) from the seed chamber 62 to attach across the openings 66a of the seed cells 66 that are formed through the perimeter of the seed transport member 48. In other embodiments, a positive pressure (e.g., a pressure higher than atmospheric pressure) would be established in the seed chamber 62 on the side of the seed transport member 48 to push the seeds into the seed cell openings 66 in the seed transport member 48.

Figure 5:
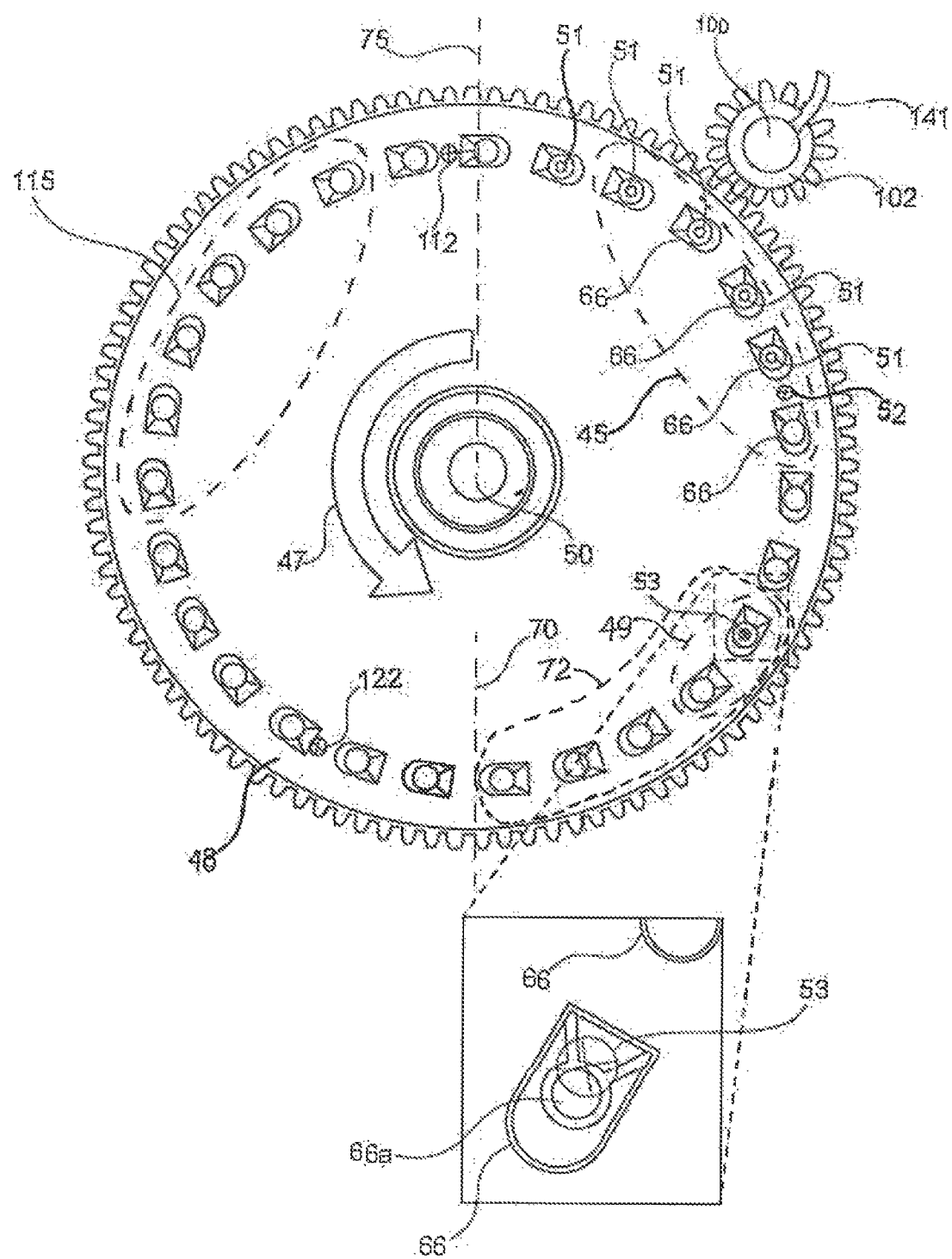
FIG. 5 provides a schematic representation of a side view of an embodiment of a seed transport member of an embodiment of a seed meter for a row unit on the planting implement of FIG. 1 and includes an inset of an enlarged area of the seed transport member.

As schematically shown in FIGS. 5, 7 and 9 for example, the seeds 51 may become attached to and rotate with the seed transport member 48 as the perimeter region of the seed transport member 48 in which the seed cells 66 are defined rotates through the seed acquisition region 45 of the seed meter 32. The seed acquisition region 45 of the seed meter 32 shown schematically in FIG. 5 for example, and the vacuum channel 64 shown in FIG. 3 for example, are disposed on opposite sides of the seed transport member 48. As schematically shown in FIG. 5 for example, the larger oval designated 45 toward the upper right portion of FIG. 5 generally surrounds and designates the seed acquisition region 45 of the seed meter 32. In this seed acquisition region 45, seeds 51 from the seed chamber 62 become positioned within respective seed cells 66 as shown in FIGS. 5, 7 and 9 and described above. The vacuum sucks the seeds 51 stored in the seed chamber 62 into the seed cells 66 on the side of the seed transport member 48 that faces into the seed chamber 62 and schematically shown in FIGS. 5, 6 and 9.

As the seed transport member 48 rotates out of the store of seeds in the seed chamber 62 and in the direction of the disc rotation arrow 47 schematically shown in FIGS. 3, 4, 5, 6, 7 and 8 for example, each seed cell 66 remains under the influence of the vacuum channel 64 and is configured to carry its load (e.g., a single seed 51 in the embodiment of FIGS. 5, 7 and 9) out of the seed chamber 62 and toward a post-delivery region 72 (FIGS. 3 and 5) of the seed meter 32. The position of the distal end 70 of the vacuum channel 64 is schematically shown by the horizontal dashed line in FIG.

5 for example. As the seed transport member 48 rotates, the seed cells 66 eventually move past the distal end 70 (FIGS. 3 and 5) of the vacuum channel 64 (FIG. 4). Once past the distal end 70 of the vacuum channel 64, the seed cells 66 no longer feel the vacuum being applied to the seed transport member 48, and so each seed cell 66 that rotates past the distal end 70 of the vacuum channel 64 exposes the seeds therein to ambient pressure on both sides of the seed cell 66. In a purely gravity fed delivery system, the force of gravity suffices to release the seeds from the seed cells 66 so that the seeds fall from the seed transport member 48. However, in a mechanically assisted delivery system, a mechanical influence pushes the seeds out of the seed cell. One example of a mechanism that delivers the mechanical push would be a rotating wheel carrying a plurality of pegs that knock the seeds out of the seed cells. Another example of a mechanism that delivers the mechanical push would be a stationary deflector disposed on the seed side of the seed transport member 48.

As schematically shown in FIG. 6, some embodiments of the seed meter 32 can include a singulator 54, which desirably is disposed between the seed acquisition region 45 and the post-delivery region 72. The singulator 54 functions to ensure that each seed cell 66 is filled with a single seed 51 as schematically shown in FIG. 7 for example. Thus, the singulator 54 is configured to remove excess seeds 51 beyond the single seed 51 that is desired to be carried by each seed cell 66 of the seed transport member 48. As schematically shown in FIG. 6, the singulator 54 desirably is connected under the control of the controller 42, which could be preprogrammed to make adjustments to the aggressiveness with which the singulator 54 sweeps across the seed cells 66 that rotate through the singulation region 115 of the seed meter 32.

As shown in FIG. 3 for example, the region of the seed meter 32 under ambient atmosphere is disposed between the distal end 70 of the vacuum channel 64 and the proximal end 71 of the vacuum channel 64 and is the post-delivery region 72 of the seed meter 32. As schematically shown in FIGS. 3 and 5 for example, the post-delivery region 72, which is beyond the effective influence of the vacuum source 40, is formed and disposed vertically above the seed output port 58 of the seed meter 32. Absent the vacuum force holding the seeds 51 within the seed cells 66 as depicted schematically in FIGS. 7 and 9, the rotation of the seed transport member 48 to move the seed cells within the post-delivery region 72 releases the seeds from the seed cells 66 in this post-delivery region 72 and allows the seeds to drop through the seed output port 58 (FIG. 3) and into a mechanism for seed delivery such as a seed tube 34. Other types of seed delivery mechanisms such as a belt delivery system may be included in a row unit 20.

Once the seeds are released from the seed transport member 48 prior to the post-delivery region 72 of the seed meter 32, the seeds are free to fall under the influence of gravity through the seed output port 58 (FIG. 3) and into the entrance of the seed tube 34 (FIG. 2). In an alternative embodiment, the seeds are free to be directly handed off to a seed delivery mechanism that mechanically carries the seed toward the seed trench. Such a delivery mechanism typically can include either a rotating belt or a rotating brush, in each case carrying the seed toward the seed trench. As schematically shown in FIG. 5 for example, the smallest dashed line oval designated 49 generally surrounds and designates the region of the seed meter 32 where the seed cells 66 already have passed through most of the post-delivery region 72 of the seed meter 32 and should be empty of seeds in the normal operation of the seed meter 32. Thus, seed detection in the seed cells 66 in this so-called empty zone region 49 of the seed meter 32 can indicate faulty operation of the seed meter 32.

In one embodiment, the seed meter 32 desirably includes a plurality of sensors. Each of the plurality of sensors has its sensing end disposed within the housing of the seed meter 32. Moreover, each of the plurality of sensors has a detection zone that is targeted so that during each complete rotation of the seed transport member 48 within the housing each seed cell 66 of the seed transport member 48 passes through the respective detection zone of each of the plurality of sensors. As schematically shown in FIGS. 4, 5, 6, 9 and 10, one of the plurality of sensors has its detection zone targeted so as to detect the presence of a seed 51 within a seed cell 66 that passes through the seed acquisition region 45 within the seed chamber 62. Accordingly, this sensor 80 is often termed the seed pool sensor 80. Desirably, as schematically indicated in FIG. 5 by the circled area designated by the numeral 52, the detection zone of this seed pool sensor 80 is aimed at the seed acquisition region 45 of the seed meter 32 and specifically at the region of the seed transport member 48 that passes through the relatively lowest region of the seed chamber 62. The seed chamber 62 defines a bottom such that seeds 51 tend to move toward the bottom due to the influence of gravity, and the perimeter region of the seed transport member that rotates within the seed chamber 62 closest to the bottom thereof is the portion of the seed transport member 48 that is moving through the seed acquisition region 45 of the seed meter 32.

As the seed transport member 48 is rotating through the seed chamber 62, each individual seed cell 66 can be said to be orbiting about the central axis of rotation 50. Continuing the planetary orbital metaphor, a so-called perigee location is arbitrarily defined as the location within the seed chamber 62 a seed cell 66 most closely approaches the absolute bottom of the seed chamber 62. At some particular moment during each complete orbit of a single seed cell 66 in the rotating seed transport member 48, that seed cell 66 will pass through the perigee location within the seed chamber 62. Accordingly, the detection zone 52 shown in FIG. 5 can be said to be located just downstream (moving in the counter-clockwise direction of arrow 47) from the perigee location of the passage of the seed cells 66 through the seed chamber 62.

However, the precise location of this detection zone 52 of the seed pool sensor 80 can be varied within the seed chamber 62. However, as schematically shown in FIGS. 4, 5 and 6 for example, desirably the detection zone 52 of the seed pool sensor 80 will be located somewhere beneath the horizontal center plane 75 of the seed chamber 62. Possible detection zone regions 52 for a seed pool sensor 80 might in some embodiments be directed so as to target the seed cell 66 that passes immediately adjacent in the clockwise direction to the seed cell 66 that passes closest to the bottom of the seed chamber 62. Alternatively, the aim of the detection zone 52 of the seed pool sensor 80 might in some embodiments be directed so as to target the seed cell 66 immediately adjacent in the counterclockwise direction (arrow 47) to the seed cell 66 that passes closest to the bottom of the seed chamber 62.

Referring to FIG. 5 for example, the target area designated within the circle labeled 52 is indicative of the region of the perimeter of the seed transport member 48 that would be sensed by a detection signal triggered from the emitter of a seed pool sensor 80, which desirably is disposed in the vacuum channel 64. So disposed, the seed pool sensor 80 is able to target passage of the seed cells 66 as the seed transport member 48 rotates within the housing through the seed acquisition region 45 of the seed meter 32. Desirably, the seed pool sensor 80 is disposed in the vacuum channel 64 and desirably carried by the vacuum wall 65 and embedded therein with its sensing end disposed contiguous with the vacuum channel wall 65 with exposure into the vacuum channel 64. Due to the constant high velocity air passing through the vacuum channel 64, dust cannot build up to any significant degree on the interior surface of the vacuum channel 64 or on any sensor disposed therein such as the seed pool sensor 80.

As schematically shown in FIG. 5, the detection zone 52 of this seed pool sensor 80 schematically shown in FIGS. 4, 5, 6, 10 and 12 for example, desirably is aimed specifically at the seed cells 66 located in the region of the seed transport member 48 that passes through the relatively lowest region of the seed chamber 62. Once the seed cells 66 in this detection zone 52 start to become starved of seeds, then the seed meter 32 might possibly have become almost empty of seeds. Accordingly, the signal received by the seed pool sensor 80 can be provided to the controller 42 to indicate when the seed meter 32 is about to be starved of seed. Similarly, the signal received by the seed pool sensor 80 can be provided to the controller 42 to indicate when the seed meter 32 is about to be starved of a first variety of seed before the controller 42 switches the seed meter 32 to dispense a second variety of seed. In each case, the controller 42 can be preprogrammed to determine when the seed chamber 62 has become empty by for example counting a predetermined number of empty seed cells 66 in this detection zone 52 for a predetermined number of seed cells 66 that pass through this detection zone 52. As an example, if in a sample of 20 seed cells 66 passing through the detection zone 52, the seed pool sensor 80 receives detection signals indicative of empty seed cells 66 in 8 or more of the passing seed cells 66, the controller 42 can be preprogrammed to implement procedures intended to respond to a condition of the seed chamber 62 starved of seeds. For example, as schematically shown in FIG. 6 for example, the controller 42 can be preprogrammed to switch the seed meter 32 to dispense a second variety of seed by operating the switching mechanism 31 to switch the variety of seed 51 being supplied from the seed hopper 30 to the entrance of the seed meter 32 or refill the seed meter 32 from the seed hopper 30 with additional seed 51 of the same variety.

The seed pool sensor 80 can be an optical sensor. One example of an optical sensor is one that emits a narrowly focused beam in the infrared region of the electromagnetic spectrum. In the embodiment schematically depicted in FIG. 4 for example, the first sensor 80 is a break beam sensor, which requires a receiving element 82 on one side of the seed transport member 48 and an emitter 81 on the opposite side of the seed transport member 48. While in the embodiments schematically depicted in FIGS. 6, 7, 8, 9, 10 and 12 for example, the seed pool sensor 80 is a reflectance sensor that combines the emitter 81 and receiver 82 disposed to only one side of the seed transport member 48. As shown in FIGS. 8, 9, 10, 11 and 12 for example, one desirable embodiment of the seed pool sensor 80 is a module that includes an emitter 81 and a receiver 82 and is held and carried at one end of the arcuate opening 73 defined through a flat planar housing 74 that is bolted in place between the mechanical housing assembly 67 and the vacuum manifold 59.

Other types of sensors could be employed in other embodiments, and for example the seed pool sensor 80 could be a capacitive proximity sensor. Moreover, as schematically shown in FIG. 7 for example, the sensing end of a sensor 80 carried by seed meter can be disposed within the seed chamber of the housing and oriented to emit and receive energy along a direction that is parallel to the plane of the surface of the seed transport member 48 to detect when a seed 51 has filled a seed cell 66 that is passing adjacent the detection zone of the sensor. When disposed as depicted in FIG. 7, the detection zone of the sensor 80 is proximate passing seed cells 66 that do not pass within the detection zone of the second sensor, but the detection zone of the sensor 80 nonetheless is aimed to detect seeds 51 that may be carried by the proximate passing seed cells 66. As schematically shown in FIG. 8 for example, the sensing end of a sensor 80 or 90 carried by seed meter can be disposed within the seed chamber of the housing and oriented to emit and receive energy along a direction that is perpendicular to the plane of the surface of the seed transport member 48 to detect when a seed cell 66 passes through the detection zone of the sensor or to detect the presence of seed within a seed cell 66 that passes through the detection zone of the sensor.

Figure 8:
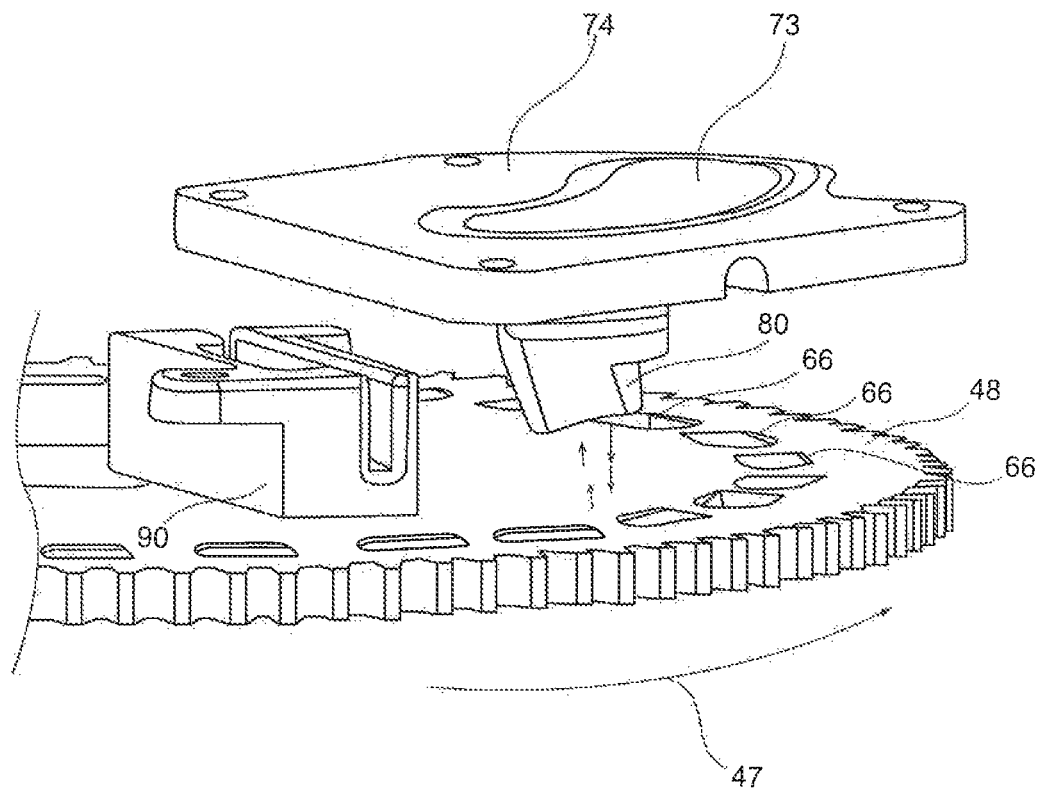
FIG. 8 provides a schematic representation of a section of the seed transport member and each of two sensors having its sensing end disposed within the housing and oriented to emit and receive in a direction that is perpendicular to the plane of the surface of the seed transport member to detect when a seed cell passes through the detection zone of the sensor targeting a different area of the surface of the seed transport member containing seed cells.
Figure 9:
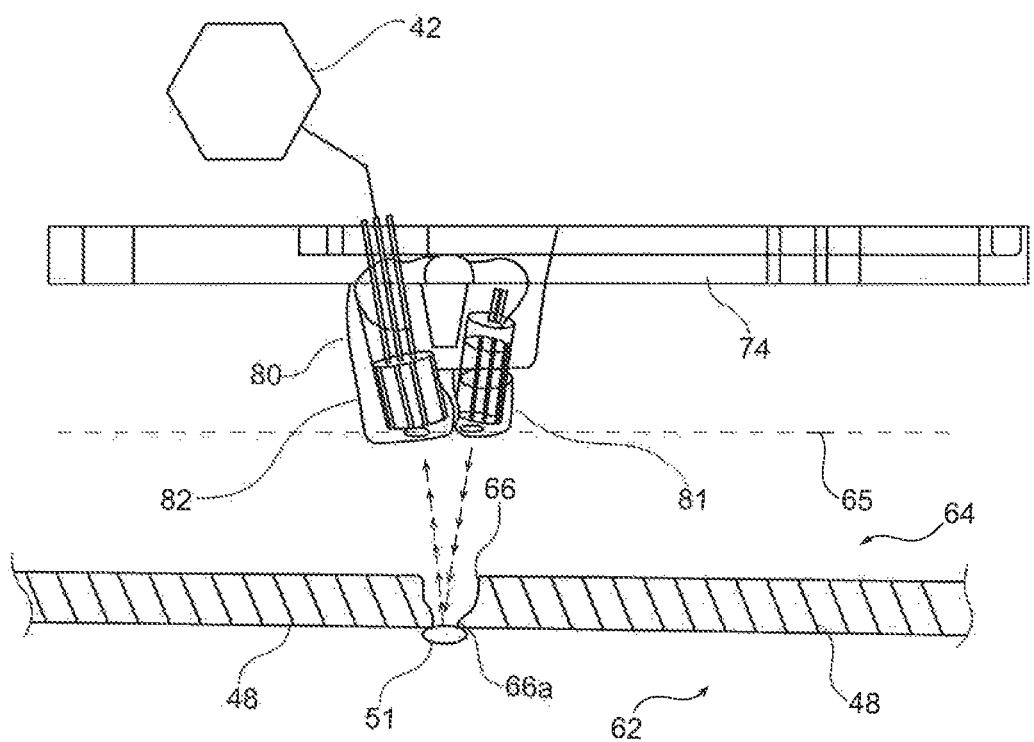
FIG. 9 provides a schematic representation of certain relationships between various components of an embodiment of the seed meter and a sensor having its sensing end disposed within the vacuum chamber of the housing and oriented to emit and receive in a direction that is relatively perpendicular to the plane of the surface of the seed transport member to detect when a seed cell passes through the detection zone of the sensor.
Figure 10:
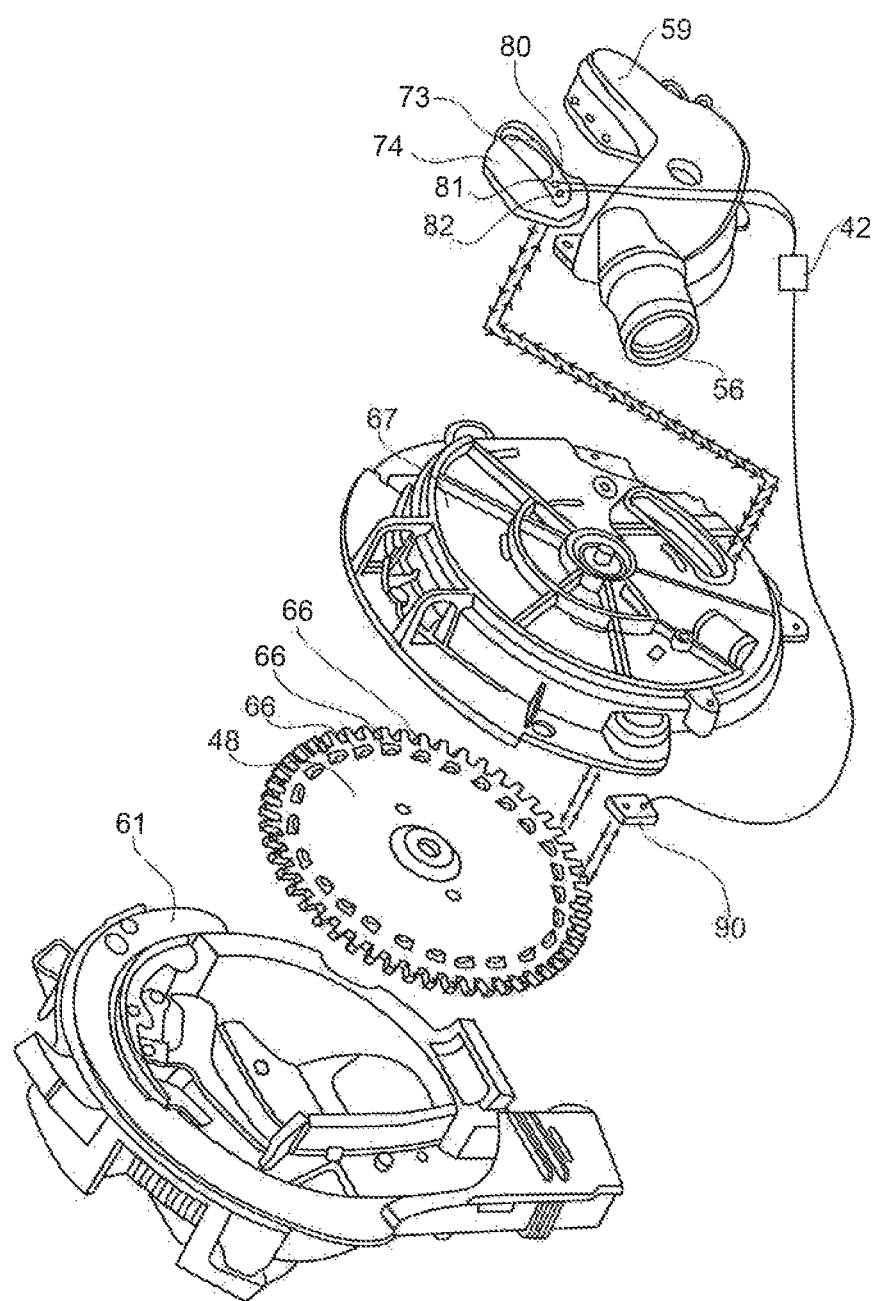
FIG. 10 provides a perspective view in a partially disassembled condition of another embodiment of a seed meter of a row unit on the planting implement of FIG. 1.
Figure 11:
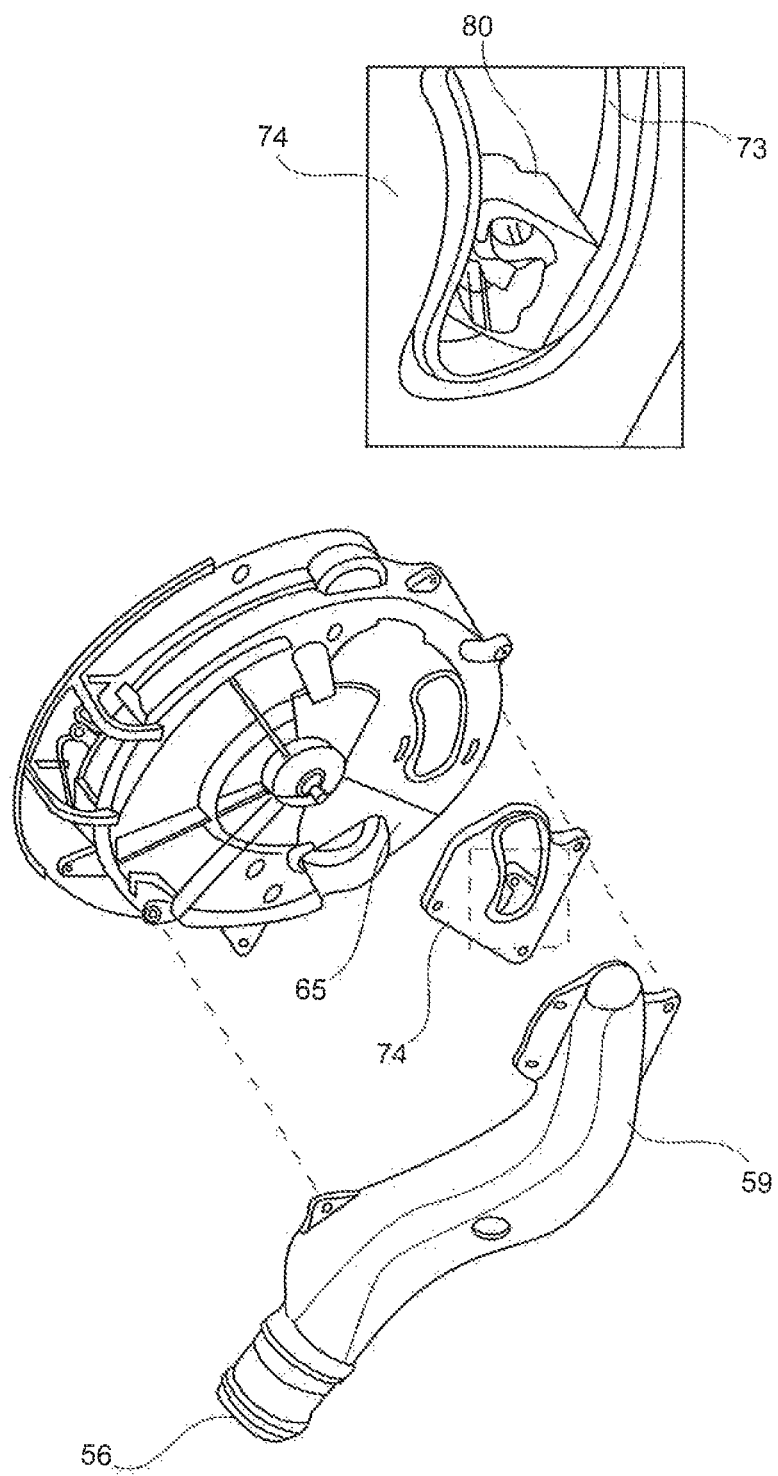
FIG. 11 provides a perspective view in a partially disassembled condition of components of an embodiment of a seed meter and includes an inset of an enlarged region of one of the components.
Figure 12:
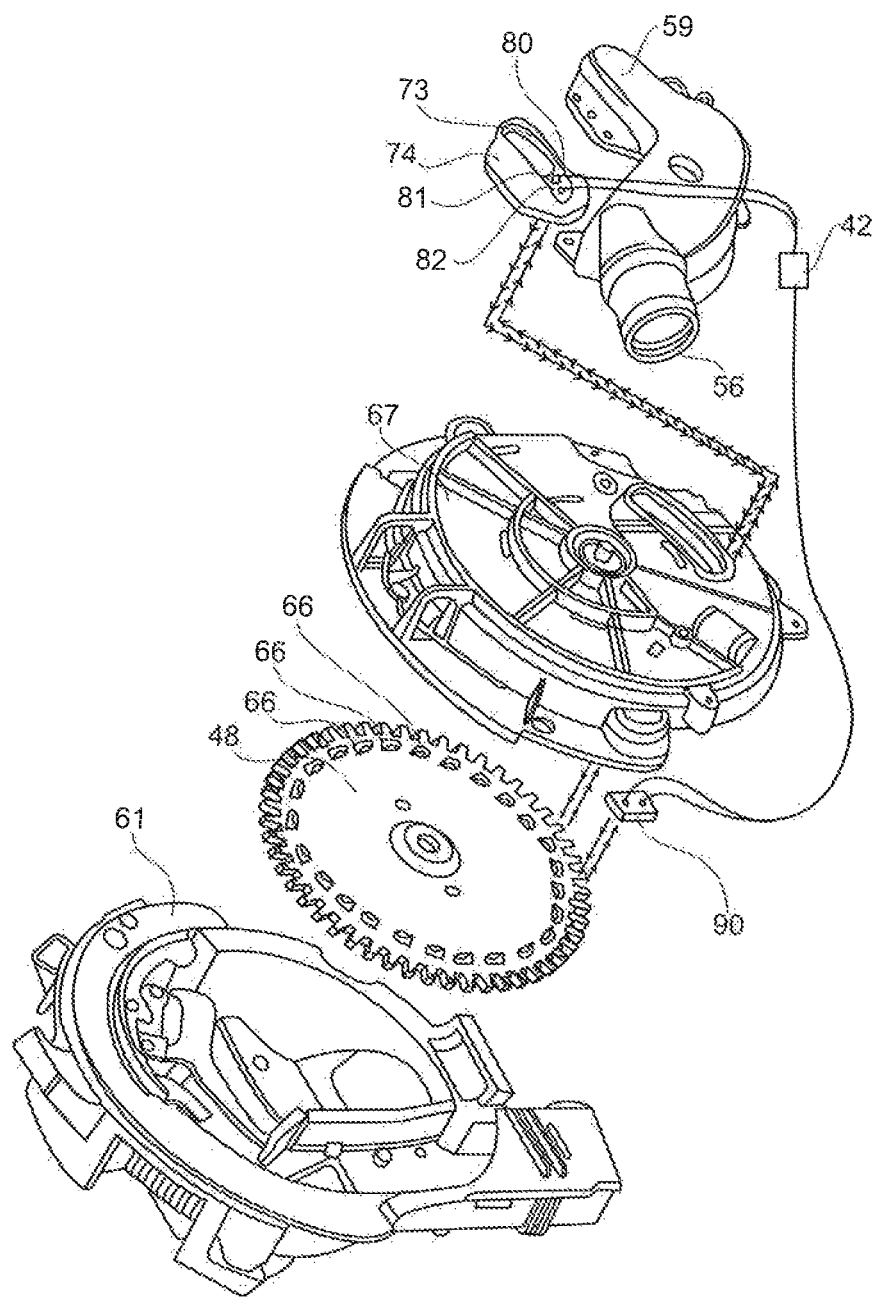
FIG. 12 provides a perspective view in a partially disassembled condition of another embodiment of a seed meter of a row unit on the planting implement of FIG. 1.

The detection signal emitted by the sensor 80 is schematically represented in FIGS. 4, 8, 9, 10 and 12 by the dashed lines with the arrows pointing in the direction from the first sensor 80 in the figure toward the seed transport member 48. In FIG. 7, the detection signal emitted by the sensor 80 is schematically represented by the solid straight line that extends between the sensor 80 and the seed 51. The detection signal received by the first sensor 80 is schematically represented in FIGS. 4, 8 and 9 by the dashed lines with the arrows pointing in the direction from the seed transport member 48 toward the receiving element 82 of the sensor 80 at the seed cover assembly 61 of the housing of the seed meter 32. In FIG. 7, the detection signal received by the sensor 80 is schematically represented by the dashed line that extends between the sensor 80 and the seed 51. Similarly, the detection signal received by the first sensor 80 is schematically represented in FIGS. 8, 10 and 12 by the dashed lines with the arrows pointing in the direction from the seed transport member 48 toward the sensor 80 in the figure.

Figure 13:
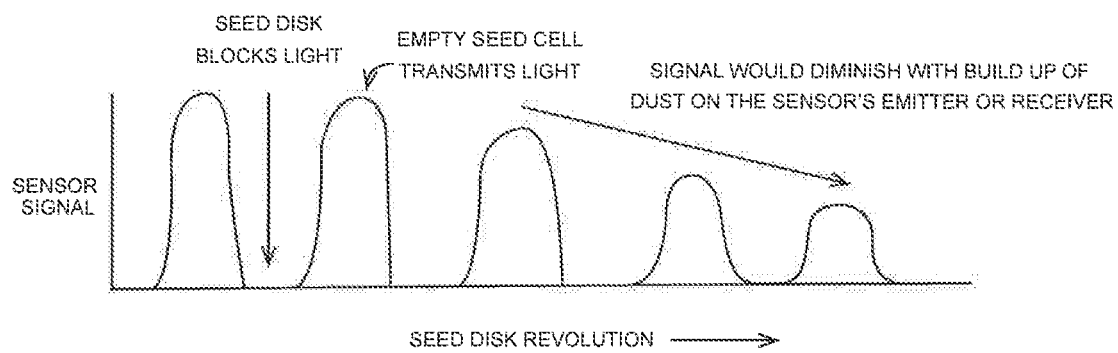
FIG. 13 provides a graphic representation of the relationship between the revolving seed transport member of a seed meter as recorded by the signal of a break beam style sensor in accordance with an embodiment of the present invention.

FIG. 13 schematically represents the different types of signals that are transmitted from the seed pool sensor 80 to the controller 42 as a consequence of the sensor's emission of a detection signal in the target region 52 (FIG. 5) of the seed transport member 48. FIG. 13 schematically represents these different types of transmission signals from a break beam style infrared optical sensor in a clean environment versus an environment in which there has been an accumulation of dust on the emitter 81 or receiver 82 of the seed pool sensor 80. The two signals on the left hand side of FIG. 13 are representative of the types of signals that are transmitted from the seed pool sensor 80 to the controller 42 when the seed pool sensor 80 exists in the clean condition of the sensor. While the three signals to the viewer's right in FIG. 13 are representative of the types of signals that are transmitted from the seed pool sensor 80 to the controller 42 when the sensor 80 is soiled to varying degrees. The signal farthest to the right in FIG. 13 represents a greater degree of soiling than the other two signals to the right in FIG. 13. Note that while the magnitude of the transmitted signal differs depending on the degree of soiling, the period of the signal remains the same. That is, the time duration between expected signals remains constant. Thus, as long as a signal of some magnitude is transmitted at the expected interval, the effects of soiling can be taken into account in some manner by an algorithm used by the controller 42.

Figure 14:
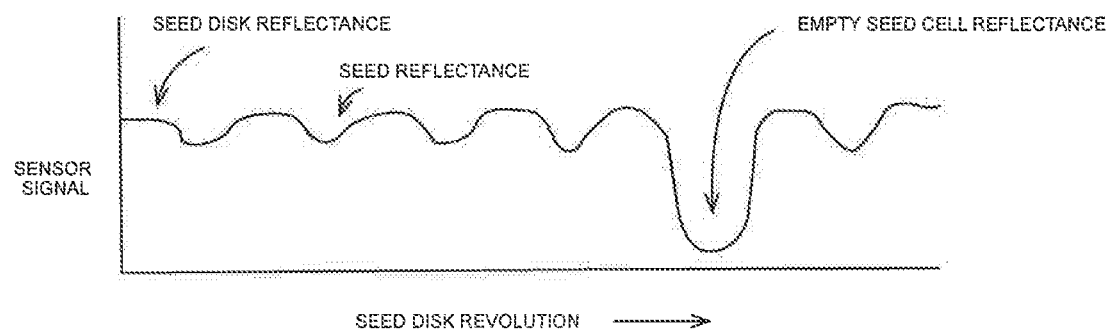
FIG. 14 provides a graphic representation of the relationship between the revolving seed transport member of a seed meter as recorded by the signal of a reflectance style sensor in accordance with an embodiment of the present invention when the seed transport member has a higher reflectance than the reflectance of the seed being deposited.

Referring to FIG. 5 for example, the target area designated within the circle labeled 52 is indicative of the region of the perimeter of the seed transport member 48 that would be sensed by a detection signal triggered from the emitter of a seed pool sensor 80, which may be a reflectance style infrared sensor for example. FIG. 14 schematically represents the magnitude of the signal reflected from the target area 52 of the seed transport member 48 when the surface of the seed transport member 48 has a higher reflectance than the surface of the seed. At the left side of FIG. 14, the difference between the magnitude of the reflected signal from the surface of the seed transport member 48 relative to the magnitude of the reflected signal from the surface of a seed contained within an individual seed cell 66 at that target area 52 of the seed transport member 48 is apparent. At the right side of FIG. 14, the greatly diminished magnitude of the signal received from reflectance at an empty seed cell 66 at the target area 52 on the perimeter of the seed transport member 48 can be compared to the magnitude of the signal received from reflectance from the surface of the seed transport member 48 and the magnitude of the signal received from reflectance from the seed within a seed cell 66 located at the target area 52.

Figure 15:
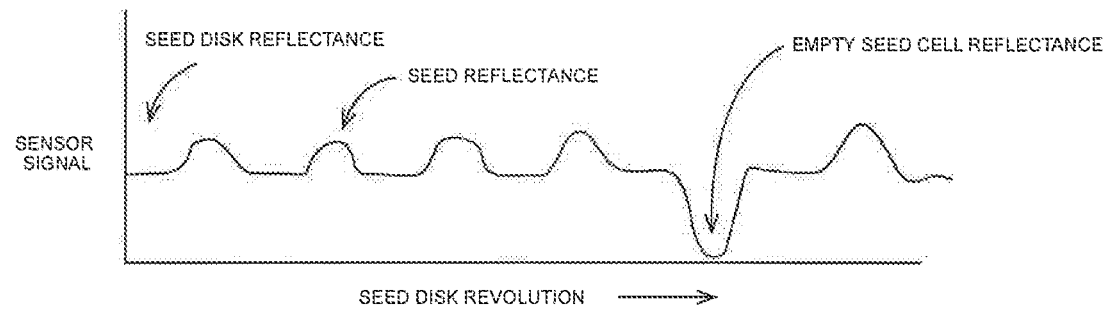
FIG. 15 provides a graphic representation of the relationship between the revolving seed transport member of a seed meter as recorded by the signal of a reflectance style sensor in accordance with an embodiment of the present invention when the seed transport member has a lower reflectance than the reflectance of the seed being deposited.

FIG. 15 schematically represents the magnitude of the signal detected at the target area 52 of the seed transport member 48 when the surface of the seed transport member 48 has a lower reflectance than the surface of the seed. The left side of FIG. 15 schematically illustrates the difference between the signal that is detected by reflectance from the surface of the seed transport member 48 relative to the signal that is detected by reflectance from a seed contained within an individual seed cell 66 at that target area 52 of the seed transport member 48. At the right side of FIG. 15, the greatly diminished signal received from reflectance at an empty seed cell 66 at the target area 52 on the perimeter of the seed transport member 48 can be compared to the magnitude of the signal generated due to reflectance from the surface of the seed transport member 48 and to the magnitude of the signal generated due to reflectance from the seed being carried within a seed cell 66.

In accordance with one aspect of the present invention, the controller 42 can be preprogrammed with algorithms that differentiate between the anticipated patterns of the magnitude of the signals that are transmitted from the seed pool sensor 80 to the controller 42 and correspond to the anticipated spacing between adjacent seed cells 66. The signal received by the seed pool sensor 80 can be provided to the controller 42 to indicate when the seed cells 66 of the seed meter 32 are being starved of seed and thus are empty. Referring to FIG. 5 for example, because of the targeting location of the detection zone 52 of the seed pool sensor 80, though the sensor 80 may detect empty seed cells 66 on the seed transport member 48, this condition of empty seed cells 66 at the detection zone 52 does not necessarily equate to an empty seed pool in the seed chamber 62. It might merely indicate a failure of one or more seed cells 66 to acquire a seed 51, and thus might indicate that the vacuum source 40 needs to generate greater negative pressure. As the seed transport member 48 rotates past the detection zone 52, unless the seed chamber 62 is in fact starved of seeds, the empty seed cells 66 still have an opportunity to pick up seed 51 as the seed cells 66 continue to rotate through the seed pool that may exist within the seed chamber 62. Accordingly, when the seed pool sensor 80 detects empty seed cells 66, the controller 42 can be programmed to interpret such a condition as an indication that one or more operating parameters of the seed meter 32 needs to be adjusted so that the performance of the seed meter 32 is not hindered. Examples of such operating parameters include adjusting the vacuum level maintained by the vacuum source 40, adjustments to any seed baffle, adjustments to seed agitation, adjustments to the planting speed, adjustments to any switching mechanism 31 such as adjustments to any seed gates whether opening or closing, or adjustments to any fluted rollers provided for seed supply whether engaging or disengaging.

The signal received by the seed pool sensor 80 also can be provided to the controller 42 to indicate when the seed meter 32 is about to be starved of a first variety of seed before the controller 42 switches the seed meter 32 to dispense a second variety of seed or refills the seed chamber 62 from the hopper 30 with the same variety of seed. Additionally, the signal received by the seed pool sensor 80 also can be provided to the controller 42 to indicate when the seed meter 32 is being deprived of seed because of a malfunction upstream of the seed meter 32. Some examples of such upstream problems might include a plugged seed supply hose, seed that is bridged in the hopper 30 and thus ceasing to flow, a seed hopper 30 that has become fully depleted of seed or a malfunction of the switching mechanism 31.

As schematically shown in FIG. 6 for example, several sensors 80, 90, 110, 120 desirably are mounted to the seed meter 32, and each sensor 80, 90, 110, 120 is connected so as to transmit respective detection signals to the controller 42. Each sensor 80, 90, 110, 120 possesses enough signal resolution to enable the controller 42 to differentiate between whether a seed cell 66 is presented within the respective detection zone 52, 53, 112, 122 of the respective sensor 80, 90, 110, 120, as opposed to an interstitial portion of the seed transport member 48 being presented within the detection zone of the sensor, and whether the seed cell 66 is filled or empty. Moreover, as schematically depicted in FIGS. 5 and 6, each sensor 80, 90, 110, 120 is oriented to detect when a seed cell 66 of the seed transport member 48 passes through the respective detection zone 52, 53, 112, 122 (FIG. 6) of the respective sensor 80, 90, 110, 120 (FIG. 5). Additionally, each one of a plurality of the sensors 80, 110, 120 desirably has its sensing end disposed within the vacuum channel 64 of the seed meter 32 and is aimed to target its detection zone 52, 112, 122 at a respective separate region within the seed chamber 62 of the seed meter 32.

According to one embodiment of a seed cell detection method, each sensor 80, 90, 110, 120 independently detects passing seed cells 66 based on the peaks and valleys of the voltage signals emitted by the sensor to the controller 42, which evaluates the signals and determines whether the seed cell 66 is passing through the detection zone of the sensor and whether the seed cell 66 is filled or empty based on the patterns of voltages being emitted to the controller 42 by the particular sensor. This embodiment of the seed meter 32 has the advantage of being capable of implementation without requiring any fixed geometrical relationship between the locations of the seed cells 66 relative to the detection zones 52, 53, 112, 122 (FIG. 6) of the sensors 80, 90, 110, 120. Accordingly, this embodiment is adaptable to many different seed transport members 48, which have a different number of seed cells 66 around the periphery of the seed transport member 48. However, in order to implement this embodiment, the controller 42 must be capable of a somewhat complex analysis of the signals from the sensors 80, 90, 110, 120 targeting respective regions 45, 49, 115, 72 within the seed meter 32.

In accordance with another aspect of the present invention, one of the sensors is employed as a timing sensor 90, which as schematically shown in FIGS. 10 and 12 desirably is aimed at the seed cells 66 in the perimeter region of the seed transport member 48 that rotate outside of the vacuum channel 64 and outside of the seed chamber 62. Referring to FIG. 5 for example, this designated timing sensor 90 desirably is aimed at the perimeter region of the seed transport member 48 that passes through the empty zone region 49 of the seed meter 32 where a vacant seed cell 66 is expected. This empty zone region 49 of the seed meter is schematically delineated in FIG. 5 as the area within the smallest dashed line oval.

Moreover, as shown in FIGS. 10 and 12, this timing sensor 90 desirably is carried by the mechanical housing assembly 67 and/or the seed cover assembly 61 outside of the vacuum channel 64 and outside of the seed chamber 62 and thus in the post-delivery region 72 shown in FIG. 5. Because the seed cells 66 in the post-delivery region 72 will be starved of seeds apart from the occasional stuck seed remnant, this timing sensor 90 is not likely to be affected by soiling. Accordingly, the timing sensor 90 will provide a relatively uniform and reliable signal that can be readily analyzed by the controller 42 to indicate when a seed cell 66 is passing through the detection zone of the timing sensor 90.

In accordance with another aspect of the present invention, the relatively uniform and reliable signal provided by the timing sensor 90 desirably can be used by the controller 42 as a timing signal for evaluating the detection signal being received by other sensors. As schematically shown in FIG. 6 for example, these other sensors can include a seed pool sensor 80, a pre-singulator sensor 110 and a post-singulator sensor 120. The desirable use of a seed pool sensor 80 has been discussed above. The region of the seed meter 32 where the singulator 54 would be encountered by the seed cells 66 of the seed transport member 48 is schematically represented in FIG. 6 by the dashed outline designated by the numeral 115. As schematically shown in FIG. 6 for example, a pre-singulator sensor 110 targets the region within the seed chamber 62 that is immediately before the seed cells 66 of the seed transport member 48 would encounter a singulator 54 during rotation of the seed transport member 48 in the direction indicated by the curved arrow 47. A location immediately before the seed cells 66 encounter the singulator 54 during each complete rotation of the seed transport member 48 within the housing provides a useful location for assessing the operational status of the seed meter 32 and thus for the placement of a pre-singulator sensor 110. Similarly, as schematically shown in FIG. 6 for example, a post singulator sensor 120 that targets the region within the seed chamber 62 that is immediately after the seed cells 66 of the seed transport member 48 would encounter a singulator 54 during rotation of the seed transport member 48 in the direction indicated by the curved arrow 47 provides an additional convenient location for the placement of a post-singulator sensor 120. Because the operational relationships between the timing sensor 90 and the seed pool sensor 80 are essentially the same as the relationships between the timing sensor 90 and the other seed cell sensors (e.g., 110, 120) that are employed during the functioning of the seed cell detection system described herein, for the sake of brevity only these relationships of the timing sensor 90 and the seed pool sensor 80 are explicitly described below.

Thus, when the timing sensor 90 and the seed pool sensor 80 can be arranged in a configuration that permits a seed cell 66 to pass through the detection zone 52 of the seed pool sensor 80 (FIG. 5) in the seed chamber 62 at the same time that a different seed cell 66 is passing through the respective detection zone of the timing sensor 90 in the empty zone region 49 (FIG. 5) of the seed meter 32, then the controller 42 can be programmed to take a reading of the seed pool sensor 80 each time the timing sensor 90 detects an empty seed cell 66.

However, some embodiments of the seed meter 32 impose restrictions that render such precise arrangements of the relative disposition between the seed pool sensor 80 and the timing sensor 90 unsuitable, ill-advised, or superseded by other engineering considerations. Thus, in embodiments of the seed meter 32 subject to imprecise arrangements of the relative dispositions between the seed pool sensor 80 and the timing sensor 90, the controller 42 can be programmed to perform a running sampling of the signal being detected by the seed pool sensor 80 to determine if the signal passes a threshold that indicates an empty seed cell 66 rather than a single point sample of the signal being detected by the seed pool sensor 80 for example. In such an embodiment, which presently is deemed to afford flexibility in design of the seed meter 32 for the reasons noted, the controller 42 can use the relatively uniform spacing of the signals received from the timing sensor 90 as a reset trigger to start evaluating the signal from the seed pool sensor 80 as each successive seed cell 66 is passing through the detection zone 52 of the seed pool sensor 80 as schematically shown in FIGS. 5, 14 and 15.

The controller can be preprogrammed to evaluate the detection signal being received by the seed pool sensor 80 only when a seed cell 66 is being addressed (passing through the detection zone 52) by the detection signal being emitted from the seed pool sensor 80. As schematically shown in FIG. 15 for example, a methodology can be employed according to one aspect of the present invention whereby the detection of the absence of a seed in the post-delivery region 72 (FIGS. 3 and 5) of the seed meter 32 by the timing sensor 90 is used by the controller 42 to coordinate the sampling of the detection signals by the seed pool sensor 80. Desirably, the timing sensor 90 will have its detection zone aimed in the empty region 49 (FIG. 5) of the seed meter 32. Employing the two separately directed sensors 80, 90 in this method, the controller 42 is preprogrammed to assume that the detection of an empty seed cell 66 by the timing sensor 90 occurs at the same time that the detection signal being emitted from the seed pool sensor 80 is addressing a seed cell 66 that is spaced farther forward along the perimeter of the seed transport member 48 that is rotating in the direction indicated schematically by the arrow designated 47 in FIG. 5. In this way, the detection signal that is received from the seed pool sensor 80, which is disposed in the region of the seed meter 32 where there is likely to be an accumulation of seeds and a greater possibility of soiling, is only evaluated at a time when the detection signal received by the seed pool sensor 80 is indicative of the condition of the seed cell 66 rather than when the signal emitted by the seed pool sensor 80 is addressing the passage of a section of the seed transport member 48 that does not contain a seed cell 66. Employing this signal sampling methodology enables the controller 42 to take action when the effects of soiling and varying degrees of reflectance from the seed transport member 48 and the seeds, which have reflectance characteristics that may vary according to the type of seed being dispensed by the seed meter 32, are least likely to affect the operation of the seed pool sensor 80.

The detection signal emitted by the timing sensor 90 is schematically represented in FIGS. 10 and 12 by the dashed lines with the arrows pointing in the direction from the timing sensor 90 at the right side of the figure toward the seed transport member 48. The detection signal received by the timing sensor 90 is schematically represented in FIG. 10 by the dashed lines with the arrows pointing in the direction from the seed transport member 48 toward the receiving element 92 of the timing sensor 90 at the seed cover assembly 61 of the housing of the seed meter 32. Similarly, the detection signal received by the timing sensor 90 is schematically represented in FIG. 12 by the dashed lines with the arrows pointing in the direction from the seed transport member 48 toward the timing sensor 90 at the right side of the figure.

Desirably, the pattern of signals detected by the timing sensor 90 can be used by the controller to determine the frequency with which the seed cells 66 pass a fixed point in the housing of the seed meter 32. In one embodiment, the controller 42 desirably can be preprogrammed to use this pattern of empty seed cells 66 detected by the timing sensor 90 to time the sampling of the detecting signals being received by the seed pool sensor 80 to determine whether one of the seed cells 66 is positioned at the detection zone 52 of the seed pool sensor 80 schematically shown in FIG. 5. Accordingly, the controller 42 desirably can be preprogrammed to examine the magnitude of the detection signal received by the seed pool sensor 80 as a return from the detection signal emitted by the seed pool sensor 80. The magnitude of this returned signal to the seed pool sensor 80 can be used to determine whether the seed cell 66 targeted by the detection signal of the seed pool sensor 80 has acquired a seed 51 as shown in FIG. 7 for example.

Thus, in one embodiment of a seed meter 32 of the present invention, a timing sensor 90 is disposed to monitor seed cells 66 that pass through the region of the seed meter 32 that is outside of the vacuum channel 64. Desirably, the timing sensor 90 that issues the timing signal has its sensing end disposed to target its detection zone at seed cells 66 that are passing through the seed meter's post-delivery region 72, which as schematically shown in FIG. 5 is outside of the vacuum channel of the seed meter. The enlarged inset of FIG. 5 schematically represents when the detection zone 53 of the timing sensor 90 has detected and empty seed cell 66 within the detection zone 53 of the timing sensor 90, at which moment the timing sensor 90 would transmit to the controller 42 a signal that the controller 32 would interpret as representative of an empty seed cell 66 within the detection zone 53 of the timing sensor 90. In these embodiments, the timing sensor 90 can be used by the controller 42 as a timing mechanism that determines the frequency with which the seed cells 66 will pass in front of the detection zones of the other sensors 80, 110, 120 for example that are targeting seed cells 66 within the seed chamber 62 so that the signals received from these other sensors 80, 110, 120 can be evaluated by the controller 42 in a coordinated fashion and thereby enable the controller 42 to focus its evaluations on only the moment or those intervals during which a seed cell 66 is presented to these other sensors 80, 110, 120 within the seed chamber f 62 or detection of either filled or vacant seed cells 66.

According to one embodiment of the seed meter 32, the timing sensor 90 detects an open seed cell 66 passing through its detection zone 53 aimed at the seed transport member 48 at a first moment. The timing sensor 90 sends to the controller 42 a signal indicative of the open seed cell 66. In this embodiment, the controller 42 is configured so that upon receiving from the timing sensor 90 this signal indicative of the open seed cell 66, the controller 42 evaluates at this first moment the signals received from the other sensors 80, 110, 120 that have their respective sensing ends disposed to target their detection zones (e.g., 52, 112, 122 in FIG. 5) at seed cells 66 that are passing through other regions of the seed meter 32. The geometry of the locations of the seed cells 66 relative to the detection zones of the timing sensor 90 and the other sensors 80, 110, 120 is fixed, and thus a seed cell 66 coincident with the detection zone 53 of the timing sensor 90 ensures that a respective other seed cell 66 will likewise be coincident with the respective detection zone (e.g., 52, 112, 122 in FIG. 5) of each of the other sensors (e.g., 80, 110, 120 in FIG. 6). This embodiment has the advantage of being capable of implementation without requiring of the controller 42 any complex analysis of the signals received from the sensors 80, 90, 110, 120 in order to detect open seed cells 66 in different regions of the seed meter 32.

According to a further embodiment of a seed meter 32, the timing sensor 90 detects an open seed cell 66 passing through its detection zone 53 aimed at the seed transport member 48 at a first moment. The timing sensor 90 sends to the controller 42 a signal indicative of the open seed cell 66. In this further embodiment, the controller 42 is configured so that upon receiving from the timing sensor 90 this signal indicative of the open seed cell 66, the controller 42 begins at this first moment a discrete number of samplings of the signals received from the other sensors 80, 110, 120, which have their respective sensing ends disposed to target their detection zones at seed cells 66 that are passing through other regions of the seed meter 32, and evaluates these signals to determine whether an open seed cell 66 was encountered. This embodiment desirably requires the availability of a controller 42 that is capable of a more complex analysis of the signals from the sensors 80, 110, 120 targeting regions within the seed chamber 62 of the seed meter 32 than was the case with the previous seed cell detection method.

In other exemplary embodiments of the present invention, as schematically shown in FIGS. 5 and 6 for example, a rotary encoder 100 can be provided to enable the controller to determine when a seed cell 66 of the seed transport member 48 will present itself within the respective detection zones 52, 112, 122 of the respective sensors 80, 110, 120 other than the timing sensor 90. An optical encoder provides one example of a suitable rotary encoder 100. As schematically shown in FIG. 5, a drive wheel 102 directly connects rotation of the seed transport member 48 with the rotary encoder 100, which is configured to transmit via a communication channel 141 connecting the rotary encoder 100 to the controller 42, pulse signals corresponding to rotation of the seed transport member 48. The controller 42 will be able to count the pulses received from the rotary encoder 100 in relation to when one of the sensors 80, 90, 110, 120 generates a signal indicating an open seed cell 66 in the respective detection zone 52, 53, 112, 122 of that respective sensor 80, 90, 110, 120.

According to an additional embodiment of a seed meter 32, the timing sensor 90 detects an open seed cell 66 passing through its detection zone 53 aimed at the seed transport member 48 at a first moment. The timing sensor 90 sends to the controller 42 a signal indicative of the open seed cell 66. The controller 90 is monitoring the pulses from the rotary encoder 100 and is preprogrammed with the number of such pulses that must ensue from this first moment until each respective one of the other sensors 80, 110, 120 will have its respective detection zone 52, 112, 122 aligned coincidentally with a passing seed cell 66 on the seed transport member 48. The controller 42 then uses this relationship in order to evaluate at the appropriate number of ensuing pulses from the rotary encoder 100, the respective signal received from the respective other sensor 80, 110, 120 that has its respective sensing end disposed to target its respective detection zone 52, 112, 122 at seed cells 66 that are passing through the respective other regions of the seed meter 32. This embodiment of the seed meter 32 that includes a rotary encoder 100 has the advantage of being capable of implementation without requiring any fixed geometrical relationship between the locations of the seed cells 66 relative to the detection zone 53 of the timing sensor 90 and the detection zones 52, 112, 122 other sensors 80, 110, 120. Accordingly, this embodiment of the seed meter 32 is adaptable for use with many different seed transport members 48, which have a different number of seed cells 66 around the periphery of the seed transport member 48. This embodiment of the seed meter 32 has the further advantage of being capable of implementation without requiring of the controller 42 any complex analysis of the signals received from the sensors 80, 110, 120 targeting seed cells 66 passing through the seed chamber 62 in order to detect open seed cells 66 in different regions of the seed meter 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring seed meter operation, the method comprising:
    operating a seed meter such that seeds contained within a seed pool region of the seed meter are transported by a seed transport member from the seed pool region to a separate location for subsequent discharge from the seed meter;
    receiving, with a controller having a processor and associated memory, a timing signal from a first sensor configured to detect a parameter associated with the operation of the seed meter; and
    evaluating; with the controller, data from a second sensor located within the seed meter based on the timing signal received from the first sensor to identify at least one of the presence or absence of a seed within one or more seed cells of the seed transport member as the seed meter is being operated to discharge seeds therefrom.

2. The method of claim 1; wherein the timing signal provides an indication of at least one of a frequency at which the seed cells pass a given location within the seed meter or a location of the one or more seed cells relative to the second sensor.

3. The method of claim 1, wherein the second sensor is configured to provide data associated with detecting the at least one of the presence or absence of a seed within a seed cell of the seed transport member as at least one of the seed cell or the seed passes through a detection zone of the second sensor.

4. The method of claim 3, further comprising analyzing the timing signal to determine when the at least one of the seed cell of the seed transport member or the seed will pass through the detection zone of the second sensor.

5. The method of claim 1, wherein evaluating the data from the second sensor comprises sampling the data from the second sensor across a given sampling period based on the timing signal received from the first sensor.

6. The method of claim 1, wherein evaluating the data from the second sensor comprises sampling the data from the second sensor at an instance at which the timing signal is received from the first sensor.

7. The method of claim 1, wherein evaluating the data from the second sensor comprises sampling the data from the second sensor upon the seed transport member being rotating a predetermined amount within the seed meter following receipt of the timing signal from the first sensor.

8. The method of claim 7, wherein the first sensor is configured to provide data indicative of at least one of a rotational position of the seed transport member within the seed meter or a degree to which the seed transport member has been rotated within the seed meter.

9. The method of claim 8, wherein the first sensor comprises a rotary encoder, the rotary encoder configured to transmit encoder pulses to the controller as said seed transport member is rotated within the seed meter, the timing signal corresponding to or being determined as a function of the encoder pulses.

10. The method of claim 1, wherein evaluating the data from the second sensor comprises:
    continuously receiving the data from the second sensor; and
    analyzing a portion of the data based on the timing signal to identify the at least one of the presence or absence of a seed within one or more of the seeds cells of the seed transport member.

11. The method of claim 1, wherein the first sensor is located within a post-delivery region of the seed meter such that the first sensor is configured to provide data associated with detecting seed cells passing by a location of the first sensor, the timing signal being associated with at least one instance at which a seed cell passes by the location of the first sensor.

12. A method for monitoring seed meter operation, the method comprising:
    operating a seed meter such that seeds contained within a seed pool region of the seed meter are transported by a seed transport member from the seed pool region to a separate location for subsequent discharge from the seed meter;
    receiving, with a controller having a processor and associated memory, a timing signal providing an indication of at least one of a frequency at which seeds cells of the seed transport member pass a given location within the seed meter or a relative location of one or more of the seed cells within the seed meter; and
    evaluating, with the controller, data from a sensor located within the seed meter based on the timing signal to identify at least one of the presence or absence of a seed within one or more of the seeds cells of the seed transport member as the seed meter is being operated to discharge seeds therefrom.

13. A system for monitoring seed meter operation, the system comprising:
    a seed meter including a seed transport member configured to transport seeds from a seed pool region of the seed meter to a separate location for subsequent discharge from the seed meter, the seed transport member including a plurality of seed cells;
    a first sensor configured to detect a parameter associated with the operation of the seed meter;

a second sensor located within the seed meter, the second sensor being separate from the first sensor; and a controller communicatively coupled to the first and second sensors, the controller including a processor and a memory, the memory storing instructions that, when implemented by the processor, configure the controller to:

receive a timing signal from the first sensor as the seed meter is being operated to discharge seeds therefrom; and evaluate data from the second sensor based on the timing signal received from the first sensor to identify at least one of the presence or absence of a seed within one or more of the seeds cells of the seed transport member as the seed meter is being operated to discharge seeds therefrom.

14. The system of claim 13, wherein the timing signal provides an indication of at least one of a frequency at which the seeds cells pass a given location within the seed meter or a location of the one or more seed cells relative to the second sensor.

15. The system of claim 13, wherein the second sensor is configured to provide data associated with detecting the at least one of the presence or absence of a seed within a seed cell of the seed transport member as at least one of the seed cell or the seed passes through a detection zone of the second sensor, the controller being configured to analyze the timing signal to determine when the at least one of the seed cell of the seed transport member or the seed will pass through the detection zone of the second sensor.

16. The system of claim 13, wherein the controller is configured to sample the data from the second sensor across a given sampling period based on the timing signal received from the first sensor or at an instance at which the timing signal is received from the first sensor.

17. The system of claim 13, wherein the controller is configured to sample the data from the second sensor upon the seed transport member being rotating a predetermined amount within the seed meter following receipt of the timing signal from the first sensor.

18. The system of claim 17, wherein the first sensor is configured to provide data indicative of at least one of a rotational position of the seed transport member within the seed meter or a degree to which the seed transport member has been rotated within the seed meter.

19. The system of claim 13, wherein the controller is configured to continuously receive data from the second sensor and analyze a portion of the data based on the timing signal to identify the at least one of the presence or absence of a seed within one or more of the seeds cells of the seed transport member.

20. The system of claim 13, wherein the first sensor is located within a post-delivery region of the seed meter such that the sensor is configured to provide data associated with detecting seed cells passing by its location, the timing signal being associated with at least one instance at which a seed cell passes by the location of the first sensor.

* * * * *